US012487557B2

(12) United States Patent
Sato et al.

(10) Patent No.: US 12,487,557 B2
(45) Date of Patent: Dec. 2, 2025

(54) IMAGE FORMING APPARATUS INCLUDING TONER CARTRIDGE THAT IS DETACHABLE FROM HOUSING WITH DRUM CARTRIDGE KEPT ATTACHED TO HOUSING

(71) Applicant: BROTHER KOGYO KABUSHIKI KAISHA, Nagoya (JP)

(72) Inventors: Shougo Sato, Seto (JP); Kazuna Taguchi, Nagoya (JP); Soichiro Mase, Handa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/813,318

(22) Filed: Aug. 23, 2024

(65) Prior Publication Data

US 2024/0411267 A1 Dec. 12, 2024

Related U.S. Application Data

(63) Continuation of application No. 18/333,087, filed on Jun. 12, 2023, now Pat. No. 12,117,765.

(30) Foreign Application Priority Data

Jun. 27, 2022 (JP) ................................ 2022-102721

(51) Int. Cl.

| | |
|---|---|
| ***G03G 15/00*** | (2006.01) |
| ***G03G 15/08*** | (2006.01) |
| ***G03G 21/18*** | (2006.01) |

(52) U.S. Cl.
CPC ..... *G03G 21/1814* (2013.01); *G03G 15/0867* (2013.01); *G03G 15/0886* (2013.01); *G03G 2215/0692* (2013.01)

(58) Field of Classification Search
CPC ........... G03G 15/0867; G03G 15/0886; G03G 21/1814

(Continued)

(56) References Cited

U.S. PATENT DOCUMENTS

| | | | |
|---|---|---|---|
| 2016/0216686 | A1 | 7/2016 | Sato |
| 2017/0160697 | A1 | 6/2017 | Sato |

(Continued)

FOREIGN PATENT DOCUMENTS

| | | | |
|---|---|---|---|
| JP | 2016-138994 | A | 8/2016 |
| JP | 2017138387 | * | 8/2017 |
| JP | 2018-155959 | A | 10/2018 |

*Primary Examiner* — Hoan H Tran

(74) *Attorney, Agent, or Firm* — Merchant & Gould P.C.

(57) ABSTRACT

An image forming apparatus includes: a housing having an opening providing a first region and a second region; first and second covers for opening and closing the first and second regions, respectively; a drum cartridge detachably attachable to the housing in a first direction through the first region; and a toner cartridge. A part of the toner cartridge attached to the drum cartridge is movable between a first position and a second position. The toner cartridge is detachable from the drum cartridge attached to the housing through the second region in a second direction crossing the first direction when the first cover is closed, the second cover is opened, and the part of the toner cartridge is at the second position. The part of the toner cartridge is movable from the first position to the second position in a third direction crossing the first and second directions.

13 Claims, 19 Drawing Sheets

(58) Field of Classification Search
USPC .......................................... 399/107, 110, 111
See application file for complete search history.

(56) References Cited

U.S. PATENT DOCUMENTS

| | | | |
|---|---|---|---|
| 2018/0267459 | A1 | 9/2018 | Sato et al. |
| 2021/0063935 | A1 | 3/2021 | Taguchi |

* cited by examiner

IMAGE FORMING APPARATUS INCLUDING TONER CARTRIDGE THAT IS DETACHABLE FROM HOUSING WITH DRUM CARTRIDGE KEPT ATTACHED TO HOUSING

REFERENCE TO RELATED APPLICATIONS

This application is a continuation of U.S. patent application Ser. No. 18/333,087, filed Jun. 12, 2023, which claims priority from Japanese Patent Application No. 2022-102721 filed on Jun. 27, 2022. The entire content of the priority applications is incorporated herein by reference.

BACKGROUND ART

One conventional image forming apparatus includes a housing formed with an opening, a drum cartridge, and a toner cartridge. The drum cartridge is attachable to and detachable from the housing through the opening. The toner cartridge is attachable to and detachable from the drum cartridge not only in a state where the drum cartridge is detached from the housing but also in a state where the drum cartridge is attached to the housing.

DESCRIPTION

According to the above-described conventional image forming apparatus, the opening of the housing is commonly used not only for exchanging the drum cartridge to which the toner cartridge is attached for a new drum cartridge, but also for exchanging the toner cartridge for a new toner cartridge. In this conventional image forming apparatus, when a user attempts to detach only the toner cartridge from the housing through the opening in a state where the toner cartridge is attached to the drum cartridge that is attached to the housing, it is conceivable that the user may happen to detach the drum cartridge by mistake.

In view of the foregoing, it is an object of the present disclosure to provide an image forming apparatus enabling a user to detach a toner cartridge alone from a housing of the image forming apparatus without accidental detachment of a drum cartridge from the housing in a state where the drum cartridge is attached to the housing and the toner cartridge is attached to the drum cartridge.

In order to attain the above and other objects, according to one aspect, the present disclosure provides an image forming apparatus including a housing, a first cover, a second cover, a drum cartridge, and a toner cartridge. The housing has an opening providing a first region and a second region. The first cover is movable between a first closed position closing the first region and a first open position opening the first region. The second cover is movable between a second closed position closing the second region and a second open position opening the second region. The drum cartridge includes a photosensitive drum. The drum cartridge is attachable to and detachable from the housing in a first direction through the first region in a state where the first cover is at the first open position. The toner cartridge is configured to accommodate toner therein and is detachably attachable relative to the drum cartridge. The toner cartridge includes a part movable between a first position and a second position in a state where the toner cartridge is attached to the drum cartridge. The toner cartridge is unable to be detached from the drum cartridge when the part of the toner cartridge is at the first position. The toner cartridge is detachable from the drum cartridge when the part of the toner cartridge is at the second position. The toner cartridge is attachable to and detachable from the drum cartridge attached to the housing through the second region in a second direction crossing the first direction in a state where: the first cover is at the first closed position; the second cover is at the second open position; and the part of the toner cartridge is at the second position. The part of the toner cartridge is movable in a third direction from the first position to the second position, the third direction crossing the first direction and the second direction.

According to the image forming apparatus described above, the first region of the opening of the housing is opened in the state where the first cover is at the first open position.

Accordingly, a user can pull out the drum cartridge from the housing in the first direction through the first region of the opening of the housing.

Further, in the state where the first cover is at the first closed position and the second cover is at the second open position, the first region of the opening of the housing is closed by the first cover and the second region of the opening of the housing is opened by the second cover.

Since the first region is closed, the user cannot remove the drum cartridge from the housing. On the other hand, the user can pull out the toner cartridge in the second direction from the drum cartridge attached to the housing through the second region that is opened.

Hence, in a case where a user attempts to detach the only toner cartridge from the drum cartridge without detachment of the drum cartridge from the housing in the state where the drum cartridge is attached to the housing and the toner cartridge is attached to the drum cartridge, the user can remove the toner cartridge alone from the drum cartridge without accidental detachment of the drum cartridge from the housing.

Further, according to the image forming apparatus of the disclosure, the toner cartridge cannot be detached from the drum cartridge when the part of the toner cartridge is at the first position in the state where the toner cartridge is attached to the drum cartridge. On the other hand, the toner cartridge can be detached from the drum cartridge when the part of the toner cartridge is at the second position in the state where the toner cartridge is attached to the drum cartridge.

Here, suppose that a direction in which the part of the toner cartridge moves from the first position to the second position is coincident with the first direction (i.e., an attachment/detachment direction of the drum cartridge relative to the housing). In this case, conceivably, the drum cartridge may move in the first direction in response to the user's operation to move the part of the toner cartridge from the first position to the second position.

If the drum cartridge moves in the first direction during the user's operation to detach the toner cartridge from the drum cartridge, the drum cartridge may abut on the first cover at the first closed position to cause the first cover to move toward the open position.

If the first cover is opened during the user's detachment operation of the toner cartridge from the drum cartridge, the drum cartridge may be accidentally detached from the housing as a result of the user's detachment of the toner cartridge from the drum cartridge.

To this effect, according to the image forming apparatus of the disclosure, the moving direction of the part of the toner cartridge from the first position to the second position (the third direction) crosses the attachment/detachment direction of the drum cartridge relative to the housing (the first direction).

With this structure, the drum cartridge is less likely to move in the first direction by the user's operation to move the part of the toner cartridge from the first position to the second direction.

Accordingly, the user's operation to detach the toner cartridge from the drum cartridge is less likely to lead to an accidental opening of the first cover.

As a result, the configuration of the disclosure can restrain the drum cartridge from being detached from the housing unintentionally due to the user's operation to detach the toner cartridge from the drum cartridge.

EMBODIMENT

Hereinafter, an image forming apparatus 1 according to one embodiment of the present disclosure will be described with reference to FIGS. 1 through 15.

1. Overview of Image Forming Apparatus 1

An overview of the image forming apparatus 1 will be described with reference to FIGS. 1 and 2.

Figure 1:
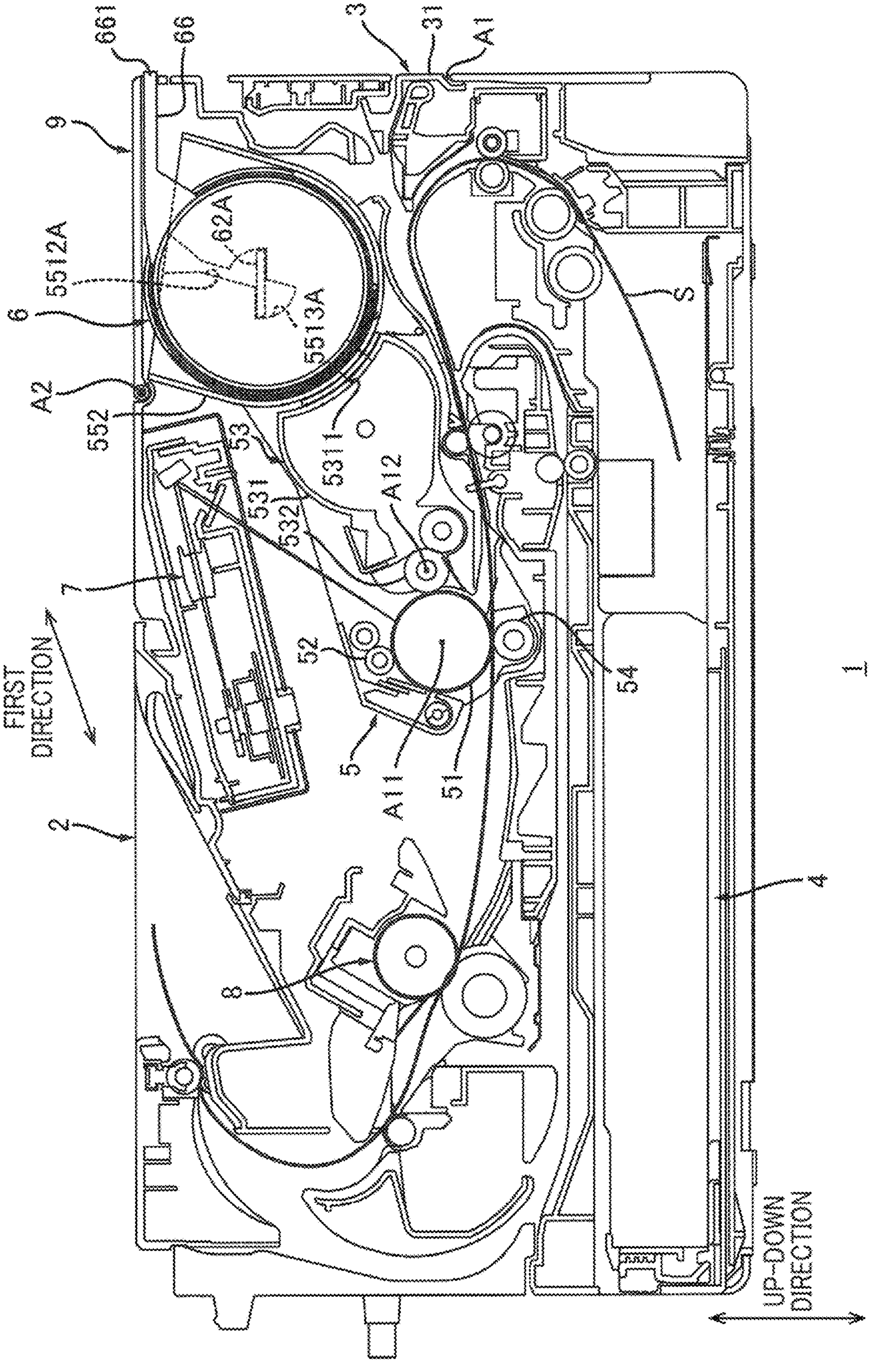
FIG. 1 is a cross-sectional view of an image forming apparatus according to one embodiment.

As illustrated in FIG. 1, the image forming apparatus 1 includes a housing 2, a first cover 3, a sheet accommodating portion 4, a drum cartridge 5, a toner cartridge 6, an exposing device 7 and a fixing device 8.

1.1 Housing 2

The housing 2 accommodates therein the sheet accommodating portion 4, the drum cartridge 5, the toner cartridge 6, the exposing device 7 and the fixing device 8. The housing 2 has an opening 21 (see FIG. 2).

1.2 First Cover 3

Figure 2:
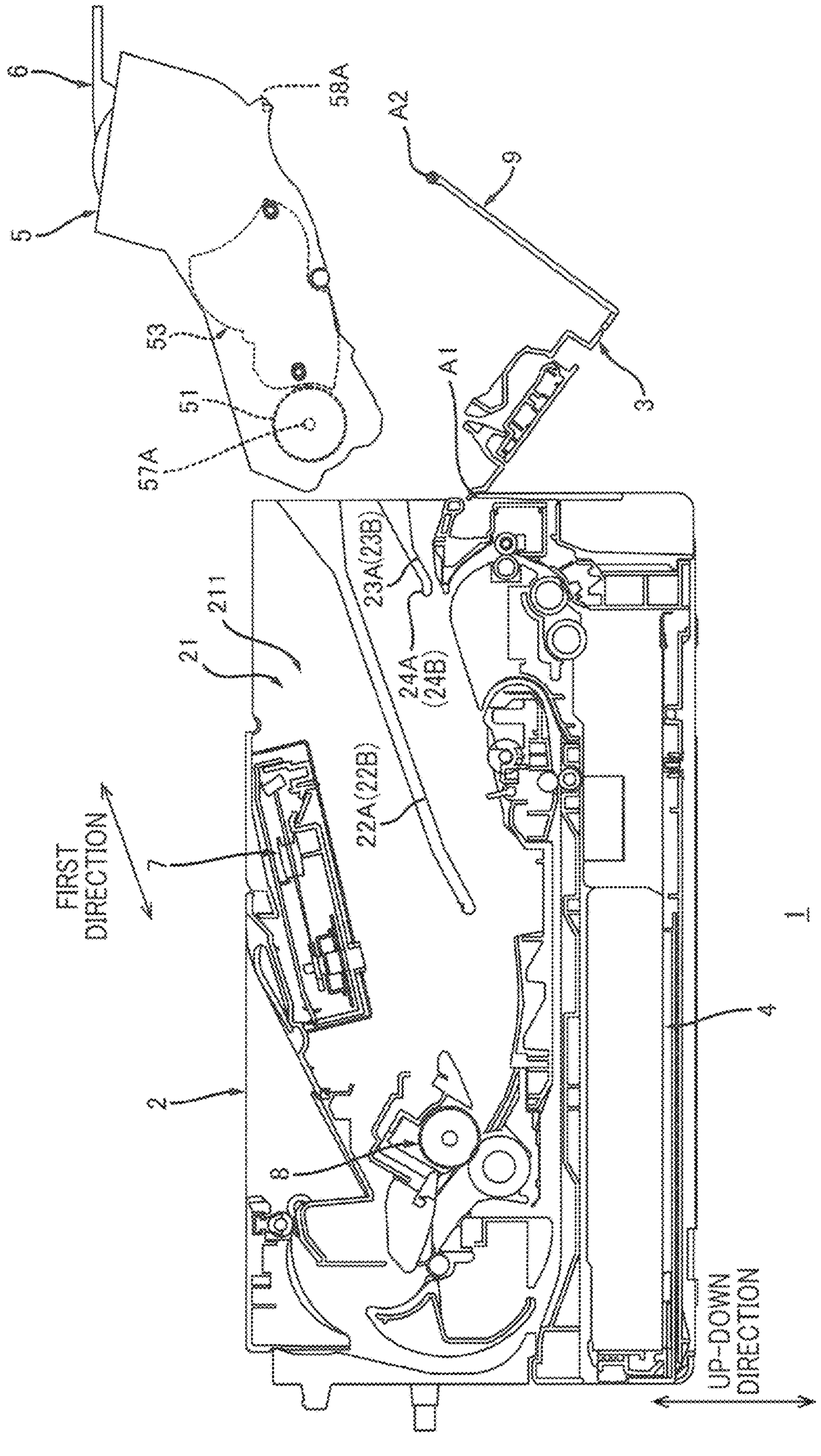
FIG. 2 is a schematic cross-sectional view of the image forming apparatus in a state where a drum cartridge illustrated in FIG. 1 is detached from a housing of the image forming apparatus.

As illustrated in FIGS. 1 and 2, the first cover 3 is movable between a first closed position (depicted in FIG. 1) and a first open position (depicted in FIG. 2). The first cover 3 is pivotally movable about a first axis A1 between the first closed position and the first open position. In a state where the first cover 3 is at the first closed position, the first axis A1 is positioned at a lower end of the first cover 3. The first axis A1 is positioned above the sheet accommodating portion 4.

As illustrated in FIG. 1, in the state where the first cover 3 is at the first closed position, the first cover 3 closes a first region 211 (see FIG. 2) of the opening 21 (see FIG. 2). As illustrated in FIG. 2, in a state where the first cover 3 is at the first open position, the first cover 3 opens the first region 211. In the present embodiment, the first region 211 corresponds to an entire region of the opening 21. That is, as illustrated in FIG. 1, in the state where the first cover 3 is at the first closed position, the first cover 3 closes the opening 21 (see FIG. 2) as a whole. As illustrated in FIG. 2, in the state where the first cover 3 is at the first open position, the first cover 3 opens the opening 21 as a whole.

1.3 Sheet Accommodating Portion 4

As illustrated in FIG. 1, the sheet accommodating portion 4 is positioned at an internal lower end portion of the housing 2. The sheet accommodating portion 4 is configured to accommodate a sheet S therein. The sheet S in the sheet accommodating portion 4 is configured to be conveyed toward a photosensitive drum 51. The photosensitive drum 51 will be described later.

1.4 Drum Cartridge 5

As illustrated in FIG. 2, in the state where the first cover 3 is at the first open position, the drum cartridge 5 is attachable to and detachable from the housing 2 in a first direction through the opening 21. That is, in the state where the first cover 3 is at the first open position, the drum cartridge 5 is attachable to and detachable from the housing 2 in the first direction through the first region 211.

As illustrated in FIG. 1, the drum cartridge 5 includes the photosensitive drum 51, a charging roller 52, a developing unit 53, and a transfer roller 54.

1.4.1 Photosensitive Drum 51

The photosensitive drum 51 is rotatable about a drum axis A11. The drum axis A11 extends in an axial direction. The axial direction crosses the first direction in a state where the drum cartridge 5 is attached to the housing 2. Preferably, the axial direction is orthogonal to the first direction. The photosensitive drum 51 extends in the axial direction. The photosensitive drum 51 has a hollow cylindrical shape.

1.4.2 Charging Roller 52

The charging roller 52 is configured to charge a peripheral surface of the photosensitive drum 51. The charging roller 52 is in contact with the peripheral surface of the photosensitive drum 51.

1.4.3 Developing Unit 53

The developing unit 53 is configured to supply toner to the photosensitive drum 51. The developing unit 53 includes a developing housing 531 and a developing roller 532.

The developing housing 531 is configured to accommodate the toner therein. The developing housing 531 supports the developing roller 532.

The developing roller 532 is configured to supply the toner accommodated in the developing housing 531 to the photosensitive drum 51. The developing roller 532 is in contact with the photosensitive drum 51. The developing roller 532 may be configured to be separated away from the photosensitive drum 51. The developing roller 532 is rotatable about a developing axis A12. The developing axis A12 extends in the axial direction. The developing roller 532 extends in the axial direction. The developing roller 532 has a hollow cylindrical shape.

1.4.4 The Transfer Roller 54

The transfer roller 54 is configured to transfer the toner from the peripheral surface of the photosensitive drum 51 to the sheet S. The transfer roller 54 is in contact with the peripheral surface of the photosensitive drum 51. Specifically, the sheet S conveyed from the sheet accommodating portion 4 is configured to pass a location between the photosensitive drum 51 and the transfer roller 54. At this time, the transfer roller 54 transfers the toner carried on the peripheral surface of the photosensitive drum 51 to the sheet S.

1.5 Toner Cartridge 6

The toner cartridge 6 is configured to accommodate toner therein. The toner cartridge 6 is attachable to and detachable from the drum cartridge 5. In the present embodiment, the toner cartridge 6 is attachable to and detachable from a drum frame 55 (FIG. 3) of the drum cartridge 5. The drum frame 55 will be described later.

In a state where the toner cartridge 6 is attached to the drum cartridge 5, the toner accommodated in the toner cartridge 6 is configured to be supplied to the developing housing 531.

1.6 Exposing Device 7

In the state where the drum cartridge 5 is attached to the housing 2, the exposing device 7 is configured to expose the peripheral surface of the photosensitive drum 51 charged by the charging roller 52 to light. The developing unit 53 is configured to supply the toner to the exposed peripheral surface of the photosensitive drum 51. In the present embodiment, the exposing device 7 is a laser scanner unit. The exposing device 7 may be an exposure head.

1.7 Fixing Device 8

The fixing device 8 is configured to fix the toner to the sheet S. In the present embodiment, the fixing device 8 is configured to apply heat and pressure to the sheet S having the toner transferred thereon for fixing the toner to the sheet S. The sheet S passing through the fixing device 8 is configured to be discharged onto an upper surface of the housing 2.

2. Details of Drum Cartridge 5

Next, the drum cartridge 5 will be described in detail with reference to FIGS. 3 through 6.

Figure 3:
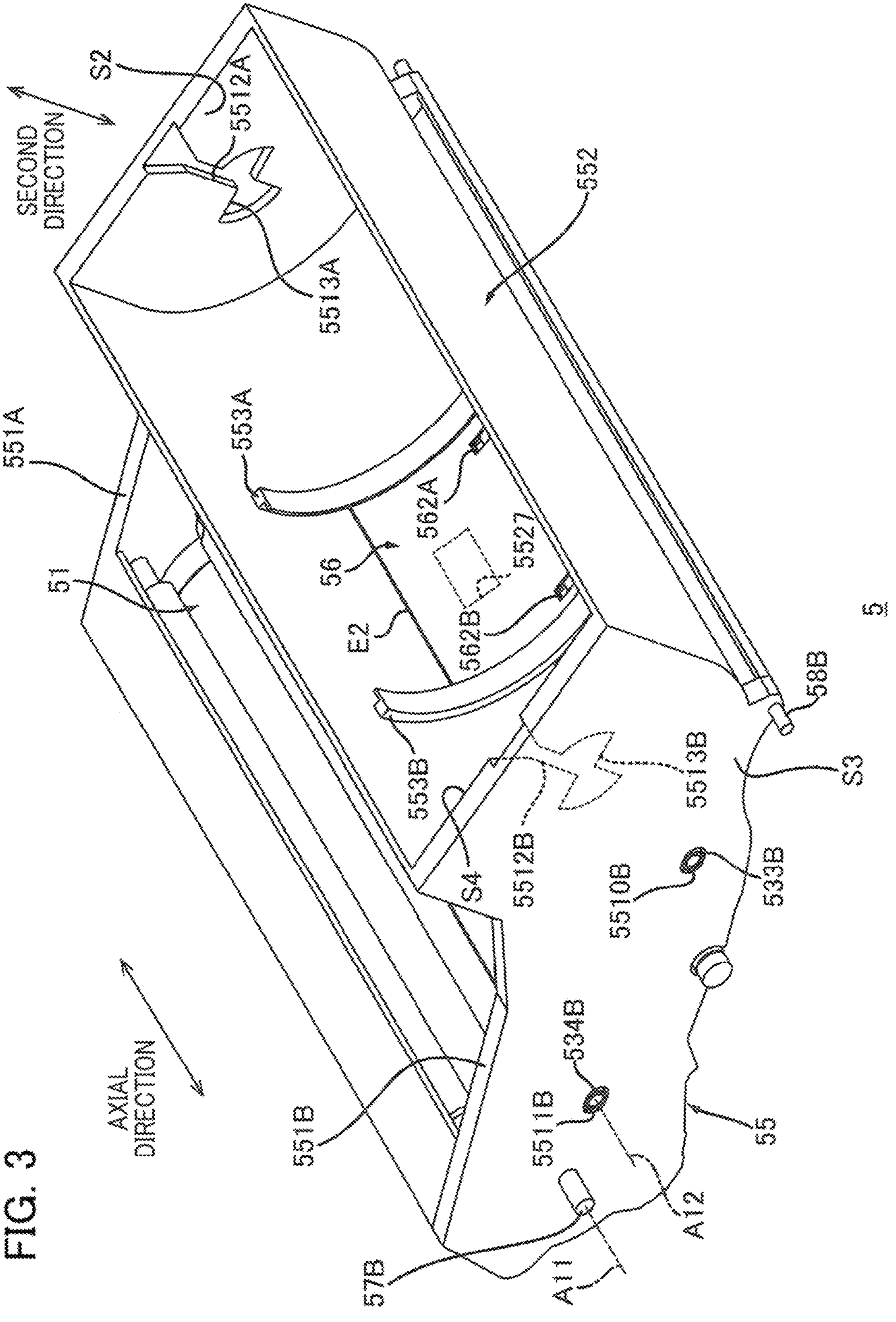
FIG. 3 is a perspective view of the drum cartridge illustrated in FIG. 2.

As illustrated in FIG. 3, the drum cartridge 5 includes the drum frame 55, a developing shutter 56, a pair of protrusions 57A and 57B (see FIG. 4), and another pair of protrusions 58A and 58B (see FIG. 4), in addition to the photosensitive drum 51, the charging roller 52, the developing unit 53, and the transfer roller 54 (see FIG. 5) described above.

2.1 Drum Frame 55

Figure 5:
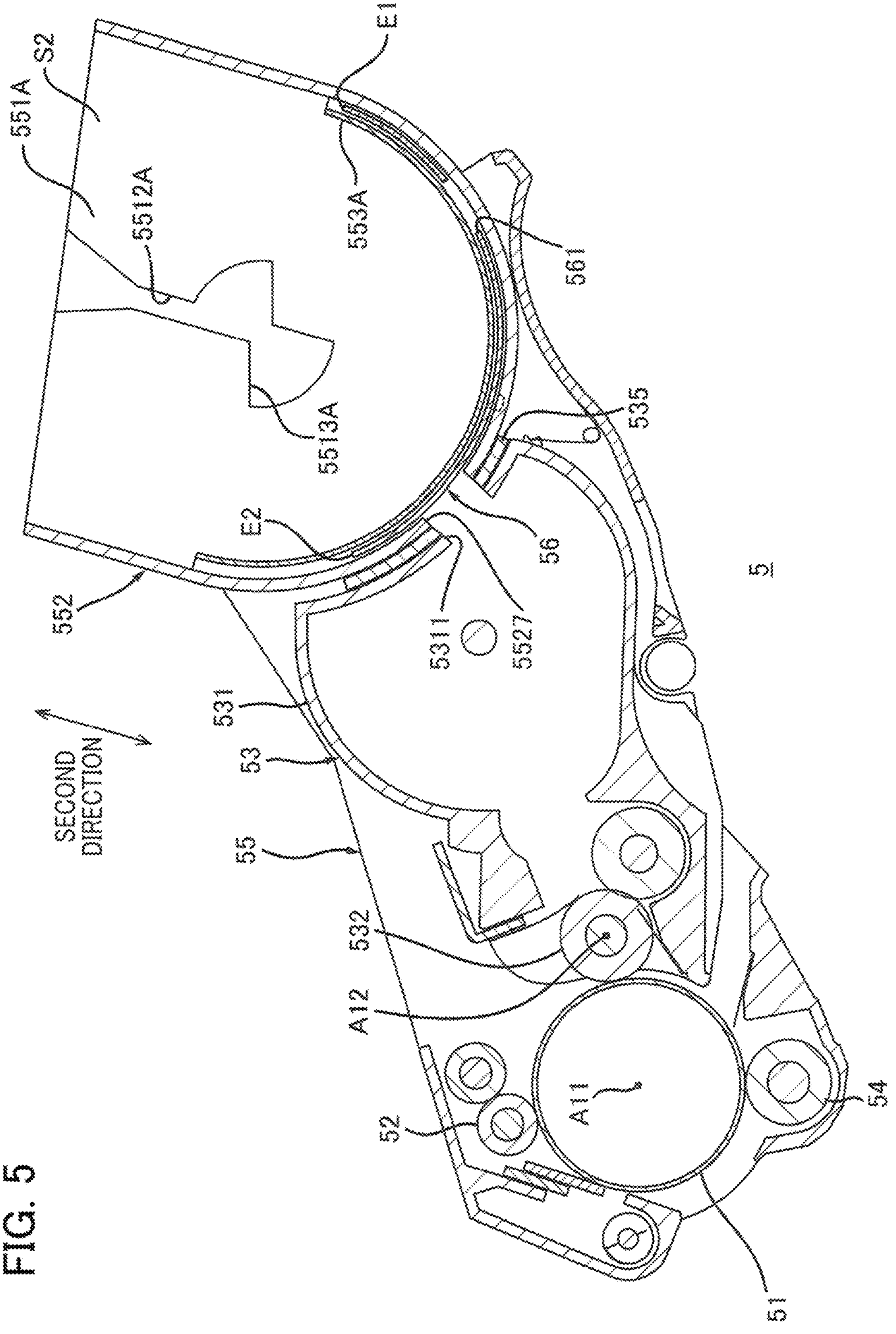
FIG. 5 is a cross-sectional view of the drum cartridge illustrated in FIG. 3 in a state where a developing shutter is at a closed position.

The drum frame 55 supports the photosensitive drum 51, the charging roller 52, the developing unit 53, and the transfer roller 54 (see FIG. 5). The drum frame 55 includes a pair of drum side plates 551A and 551B, and a support portion 552.

2.1.1 Drum Side Plates 551A and 551B

Figure 4:
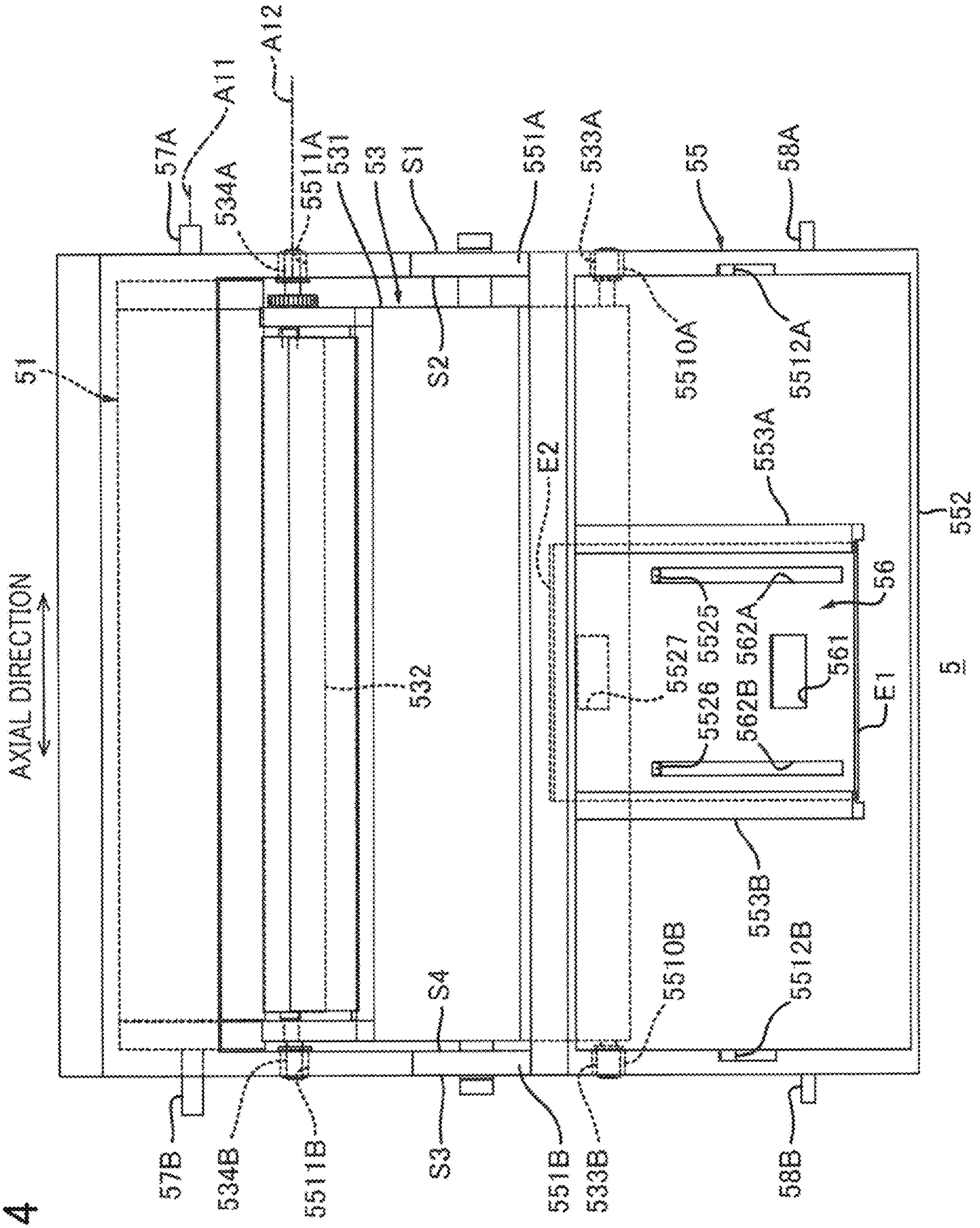
FIG. 4 is a plan view of the drum cartridge illustrated in FIG. 3.

The drum side plate 551A constitutes one end portion of the drum frame 55 in the axial direction. The drum side plate 551A extends in a direction crossing the axial direction. Preferably, the drum side plate 551A extends in a direction orthogonal to the axial direction. The drum side plate 551A has an outer surface S1 and an inner surface S2 (see FIG. 4). The drum side plate 551A supports the photosensitive drum 51, the charging roller 52, the developing unit 53, and the transfer roller 54 in cooperation with the drum side plate 551B. As illustrated in FIG. 4, the drum side plate 551A has a pair of through-holes 5510A and 5511A, a guide portion 5512A, and a locking portion 5513A (see FIG. 3).

The through-hole 5510A is positioned apart from the photosensitive drum 51 in a direction connecting the drum axis A11 and the developing axis A12. The direction connecting the drum axis A11 and the developing axis A12 is orthogonal to the axial direction. The direction connecting the drum axis A11 and the developing axis A12 may be coincident with the first direction or different from the first direction. The through-hole 5510A is an elongated hole. The through-hole 5510A is elongated in the direction connecting the drum axis A11 and the developing axis A12.

The through-hole 5511A is positioned between the photosensitive drum 51 and the through-hole 5510A in the direction connecting the drum axis A11 and the developing axis A12. The through-hole 5511A is an elongated hole. The through-hole 5511A is elongated in the direction connecting the drum axis A11 and the developing axis A12.

As illustrated in FIG. 3, the guide portion 5512A is positioned at the inner surface S2 of the drum side plate 551A. In the present embodiment, the guide portion 5512A is a groove. As illustrated in FIG. 5, the guide portion 5512A extends in a second direction. The second direction crosses the first direction.

The locking portion 5513A is positioned at one end portion of the guide portion 5512A in the second direction. In the present embodiment, the locking portion 5513A is a groove. The locking portion 5513A extends in a direction crossing the guide portion 5512A.

As illustrated in FIG. 4, the drum side frame 551B constitutes another end portion of the drum frame 55 in the axial direction. The drum side frame 551B is positioned apart from the drum side frame 551A in the axial direction. The drum side frame 551B extends in a direction crossing the axial direction. Preferably, the drum side frame 551B extends in a direction orthogonal to the axial direction. The drum side frame 551B has an outer surface S3 and an inner surface S4. The drum side frame 551B has a pair of through-holes 5510B and 5511B, a guide portion 5512B, and a locking portion 5513B (see FIG. 3).

The through-hole 5510B is positioned apart from the photosensitive drum 51 in the direction connecting the drum axis A11 and the developing axis A12. The through-hole 5510B is an elongated hole. The through-hole 5510B is elongated in the direction connecting the drum axis A11 and the developing axis A12.

The through-hole 5511B is positioned between the photosensitive drum 51 and the through-hole 5510B in the direction connecting the drum axis A11 and the developing axis A12. The through-hole 5511B is an elongated hole. The through-hole 5511B is elongated in the direction connecting the drum axis A11 and the developing axis A12.

The guide portion 5512B is positioned at the inner surface S4 of the drum side frame 551B. In the present embodiment, the guide portion 5512B is a groove. The guide portion 5512B extends in a direction coincident with an extending direction of the guide portion 5512A, i.e., in the second direction.

As illustrated in FIG. 3, the locking portion 5513B is positioned at one end portion of the guide portion 5512B in the second direction. In the present embodiment, the locking portion 5513B is a groove. The locking portion 5513B extends in a direction coincident with an extending direction of the locking portion 5513A. That is, the locking portion 5513B extends in a direction crossing the guide portion 5512B.

2.1.2 Support Portion 552

The support portion 552 is configured to support a toner casing 61 (FIG. 7) of the toner cartridge 6. The toner casing 61 will be described later.

The support portion 552 extends in the axial direction. The support portion 552 has one end portion in the axial direction that is connected to the drum side plate 551A. The support portion 552 has another end portion in the axial direction that is connected to the drum side plate 551B.

As illustrated in FIG. 4, the support portion 552 has an opening 5527, a pair of recessed portions 5525 and 5526, and a pair of guide portions 553A and 553B.

The opening 5527 is positioned at a center portion of the support portion 552 in the axial direction. The opening 5527 is positioned between the recessed portion 5525 and the recessed portion 5526 in the axial direction. The opening 5527 is positioned between the guide portion 553A and the guide portion 553B in the axial direction. As illustrated in FIG. 5, the opening 5527 is positioned between the developing housing 531 and the locking portion 5513A in the direction connecting the drum axis A11 to the developing axis A12. The opening 5527 is in communication with an inlet opening 5311 of the developing housing 531. The inlet opening 5311 will be described later.

As illustrated in FIG. 4, the recessed portion 5525 is positioned between the opening 5527 and the drum side plate 551A in the axial direction. The recessed portion 5525 is positioned between the opening 5527 and the guide portion 553A in the axial direction.

The recessed portion 5526 is positioned between the opening 5527 and the drum side plate 551B in the axial direction. The recessed portion 5526 is positioned opposite the recessed portion 5525 with respect to the opening 5527 in the axial direction. The recessed portion 5526 is positioned between the opening 5527 and the guide portion 553B in the axial direction.

As illustrated in FIG. 3, the guide portion 553A is configured to guide one end portion of the developing shutter 56 in the axial direction. The guide portion 553B is configured to guide another end portion of the developing shutter 56 in the axial direction.

As illustrated in FIG. 4, the guide portion 553A is positioned between the opening 5527 of the support portion 552 and the drum side plate 551A in the axial direction. The guide portion 553A is positioned between the recessed portion 5525 and the drum side plate 551A in the axial direction. The guide portion 553A extends in a moving direction of the developing shutter 56.

The guide portion 553B is positioned between the opening 5527 of the support portion 552 and the drum side plate 551B in the axial direction. The guide portion 553B is positioned opposite the recessed portion 5525 with respect to the recessed portion 5526 in the axial direction. The guide portion 553B is positioned opposite the opening 5527 with respect to the recessed portion 5526 in the axial direction. The guide portion 553B extends in a direction parallel to an extending direction of the guide portion 553A, i.e., the moving direction of the developing shutter 56.

2.2 Details of Developing Unit 53

As illustrated in FIG. 4, the developing unit 53 includes a sealing member 535 (see FIG. 5), two protrusions 533A and 534A, and two protrusions 533B and 534B, in addition to the developing housing 531 and the developing roller 532 described above.

2.2.1 Details of Developing Housing 531

As illustrated in FIG. 5, the developing housing 531 is positioned between the photosensitive drum 51 and the support portion 552 in the direction connecting the drum axis A11 and the developing axis A12. The developing housing 531 extends in the axial direction. The developing housing 531 has the inlet opening 5311.

The inlet opening 5311 is positioned at a center portion of the developing housing 531 in the axial direction. The inlet opening 5311 is in communication with the opening 5527 of the support portion 552. Accordingly, the inlet opening 5311 can receive the toner supplied from the toner cartridge 6 through the opening 5527 of the support portion 552. The inlet opening 5311 is positioned apart from the developing roller 532 in the direction connecting the drum axis A11 and the developing axis A12.

2.2.2 Sealing Member 535

The sealing member 535 is positioned between the developing housing 531 and the support portion 552 in the direction connecting the drum axis A11 and the developing axis A12. The sealing member 535 is positioned to surround the inlet opening 5311 and the opening 5527. The sealing member 535 seals a space between the developing housing 531 and the support portion 552. The sealing member 535 is elastically deformable in accordance with a movement of the developing unit 53 relative to the photosensitive drum 51. Thus, when the developing unit 53 moves relative to the photosensitive drum 51, the sealing member 535 can suppress leakage of the toner from the space between developing housing 531 and the support portion 552. The sealing member 535 is made from a sponge, for example.

2.2.3 Protrusions 533A, 534A

As illustrated in FIG. 4, the protrusion 533A is positioned apart from the drum axis A11 in the direction connecting the drum axis A11 and the developing axis A12. The protrusion 533A is positioned at one end surface of the developing housing 531 in the axial direction. The protrusion 533A extends outward from the one end surface of the developing housing 531 in the axial direction. The protrusion 533A may be attached to the one end surface of the developing housing 531. The protrusion 533A has a solid cylindrical shape. The protrusion 533A extends in the axial direction. The protrusion 533A is received in the through-hole 5510A of the drum side plate 551A.

The protrusion 534A is positioned between the drum axis A11 and the protrusion 533A in the direction connecting the drum axis A11 and the developing axis A12. The protrusion 534A is one end portion of a shaft of the developing roller 532. The protrusion 534A may extend outward from the one end surface of the developing housing 531 in the axial direction. The protrusion 534A may be attached to the one end surface of the developing housing 531 in the axial direction. The protrusion 534A has a solid cylindrical shape.

The protrusion 534A extends in the axial direction. The protrusion 534A is received in the through-hole 5511A of the drum side plate 551A.

2.2.4 Protrusions 533B, 534B

The protrusion 533B is positioned apart from the drum axis A11 in the direction connecting the drum axis A11 and the developing axis A12. The protrusion 533B is positioned at another end surface of the developing housing 531 in the axial direction. The protrusion 533B extends outward from the other end surface of the developing housing 531 in the axial direction. The protrusion 533B may be attached to the other end surface of the developing housing 531 in the axial direction. The protrusion 533B has a solid cylindrical shape. The protrusion 533B extends in the axial direction. The protrusion 533B is received in the through-hole 5510B of the drum side plate 551B.

The protrusion 534B is positioned between the drum axis A11 and the protrusion 533B in the direction connecting the drum axis A11 and the developing axis A12. The protrusion 534B is another end portion of the shaft of the developing roller 532. The protrusion 534B may extend from other end surface of the developing housing 531 in the axial direction. The protrusion 534B may be attached to the other end surface of the developing housing 531 in the axial direction. The protrusion 534B has a solid cylindrical shape. The protrusion 534B extends in the axial direction. The protrusion 534B is received in the through-hole 5511B of the drum side frame 551B.

The protrusion 533A, the protrusion 534A, the protrusion 533B, and the protrusion 534B are loosely engaged with the through-hole 5510A, the through-hole 5511A, the through-hole 5510B, and the through-hole 5511B, respectively. Through these loose engagements, the developing unit 53 is movable relative to the photosensitive drum 51 in the direction connecting the drum axis A11 and the developing axis A12.

2.3 Developing Shutter 56

Figure 6:
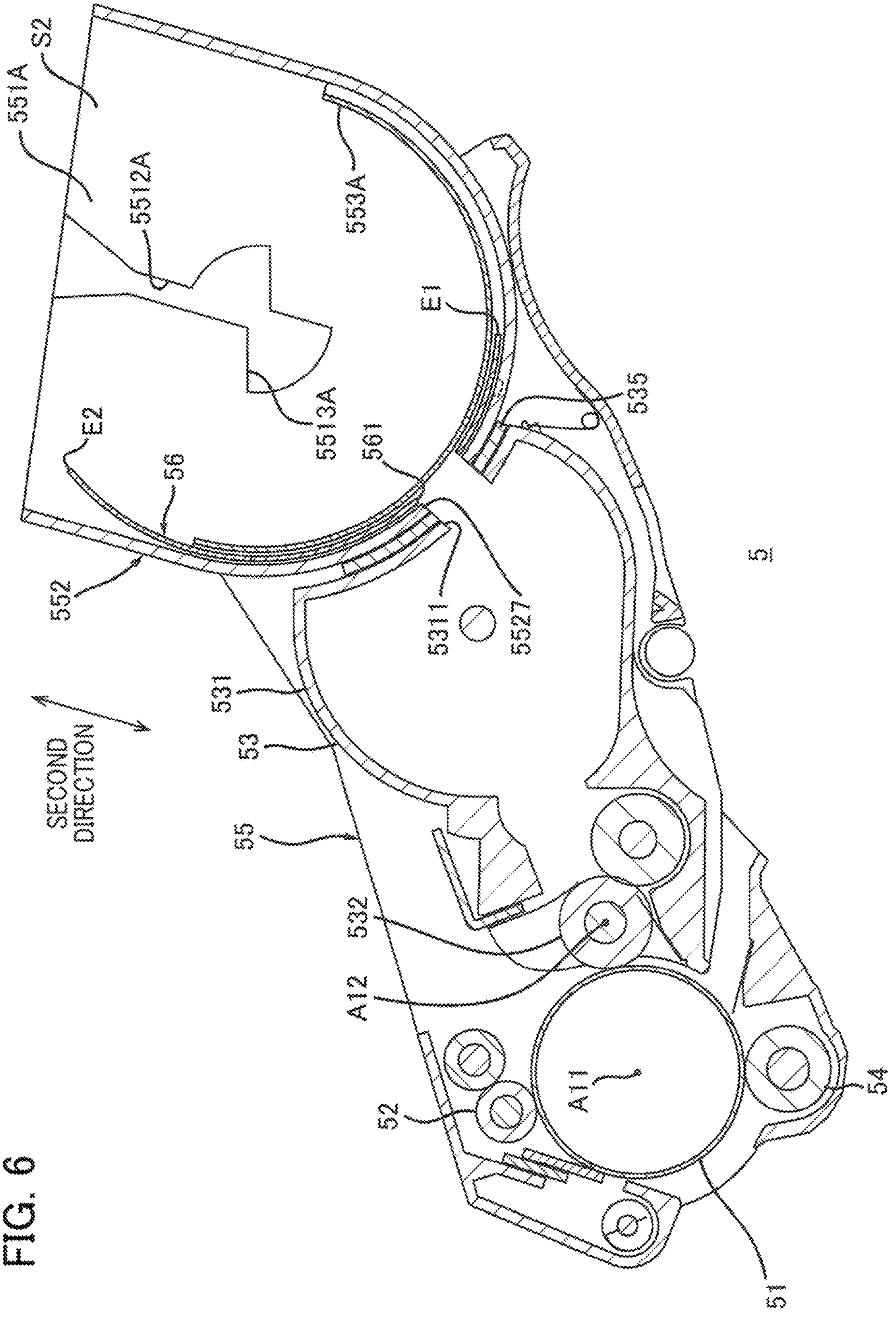
FIG. 6 is the cross-sectional view of the drum cartridge illustrated in FIG. 3 in a state where the developing shutter is at an open position.

As illustrated in FIGS. 5 and 6, the developing shutter 56 is configured to open and close the inlet opening 5311 of the developing unit 53. Specifically, the developing shutter 56 is movable between a closed position (FIG. 5) where the developing shutter 56 closes the inlet opening 5311 and an open position (FIG. 6) where the developing shutter 56 opens the inlet opening 5311.

The developing shutter 56 extends along the support portion 552. The developing shutter 56 has one end E1 and another end E2 in the moving direction of the developing shutter 56. As illustrated in FIG. 4, the developing shutter 56 is positioned at the center portion of the support portion 552 in the axial direction. The developing shutter 56 extends in the axial direction. The developing shutter 56 has one end portion in the axial direction that is fitted with the guide portion 553A. The developing shutter 56 has another end portion in the axial direction that is fitted with the guide portion 553B.

The developing shutter 56 is movable between the closed position (see FIG. 5) and the open position (see FIG. 6) while being guided by the guide portion 553A and the guide portion 553B. The developing shutter 56 has a developing shutter opening 561 and a pair of slits 562A and 562B.

2.3.1 Developing Shutter Opening 561

The developing shutter opening 561 is positioned at a center portion of the developing shutter 56 in the axial direction. As illustrated in FIG. 5, in a state where the developing shutter 56 is at the closed position, the developing shutter opening 561 is positioned away from the inlet opening 5311 of the developing unit 53. In the state where the developing shutter 56 is at the closed position, the developing shutter opening 561 does not communicate with the inlet opening 5311. As such, the developing shutter 56 closes the inlet opening 5311.

As illustrated in FIG. 6, in a state where the developing shutter 56 is at the open position, the developing shutter opening 561 is in communication with the inlet opening 5311. As such, the inlet opening 5311 is opened.

2.3.2 Slits 562A, 562B

As illustrated in FIG. 4, the slit 562A is positioned at the one end portion of the developing shutter 56 in the axial direction. The slit 562A is positioned between the developing shutter opening 561 and the drum side plate 551A in the axial direction. The slit 562A is positioned between the developing shutter opening 561 and the guide portion 553A in the axial direction. The recessed portion 5525 of the support portion 552 is positioned in the slit 562A. The slit 562A extends in the extending direction of the guide portion 553A.

The slit 562B is positioned at the other end portion of the developing shutter 56 in the axial direction. The slit 562B is positioned between the developing shutter opening 561 and the drum side frame 551B in the axial direction. The slit 562B is positioned opposite the slit 562A with respect to the developing shutter opening 561 in the axial direction. The slit 562B is positioned between the developing shutter opening 561 and the guide portion 553B in the axial direction. The slit 562B is positioned opposite the guide portion 553A with respect to the developing shutter opening 561 in the axial direction. The recessed portion 5526 of the support portion 552 is positioned in the slit 562B. The slit 562B extends in the extending direction of the guide portion 553B.

2.4 Protrusions 57A, 57B

The protrusion 57A is positioned at one end of the drum cartridge 5 in the axial direction. The protrusion 57A is positioned opposite the drum side plate 551B with respect to the drum side plate 551A in the axial direction. The protrusion 57A extends in the axial direction. The protrusion 57A has a solid cylindrical shape. The protrusion 57A is one end portion of a shaft of the photosensitive drum 51 in the axial direction. The protrusion 57A may extend outward from the drum side plate 551A. The protrusion 57A may be attached to the drum side plate 551A.

The protrusion 57B is positioned at another end of the drum cartridge 5 in the axial direction. The protrusion 57B is positioned opposite the drum side plate 551A with respect to the drum side plate 551B in the axial direction. The protrusion 57B has a solid cylindrical shape. The protrusion 57B is another end portion of the shaft of the photosensitive drum 51 in the axial direction. The protrusion 57B may extend outward from the drum side plate 551B. The protrusion 57B may be attached to the drum side plate 551B.

2.5 Protrusions 58A, 58B

The protrusion 58A is positioned at the one end of the drum cartridge 5 in the axial direction. The protrusion 58A is positioned opposite the drum side plate 551B with respect to the drum side plate 551A in the axis direction. The protrusion 58A is positioned at the outer surface S1 of the drum side plate 551A. The protrusion 58A extends from the outer surface S1. The protrusion 58A may be attached to the outer surface S1. The protrusion 58A is positioned apart from the protrusion 57A in the direction connecting the drum axis A11 and the developing axis A12. The protrusion 58A extends in the axial direction. The protrusion 58A has a solid cylindrical shape.

The protrusion 58B is positioned at the other end portion of the drum cartridge 5 in the axial direction. The protrusion 58B is positioned opposite the drum side plate 551A with respect to the drum side plate 551B in the axial direction. The protrusion 58B is positioned at the outer surface S3 of the drum side plate 551B. The protrusion 58B extends outward from the outer surface S3. The protrusion 58B may be attached to the outer surface S3. The protrusion 58B is positioned apart from the protrusion 57B in the direction connecting the drum axis A11 and the developing axis A12. The protrusion 58B extends in the axial direction. The protrusion 58B has a solid cylindrical shape.

3. Details of Toner Cartridge 6

Referring to FIG. 7 to FIG. 12, the toner cartridge 6 will be described in detail.

Figure 7:
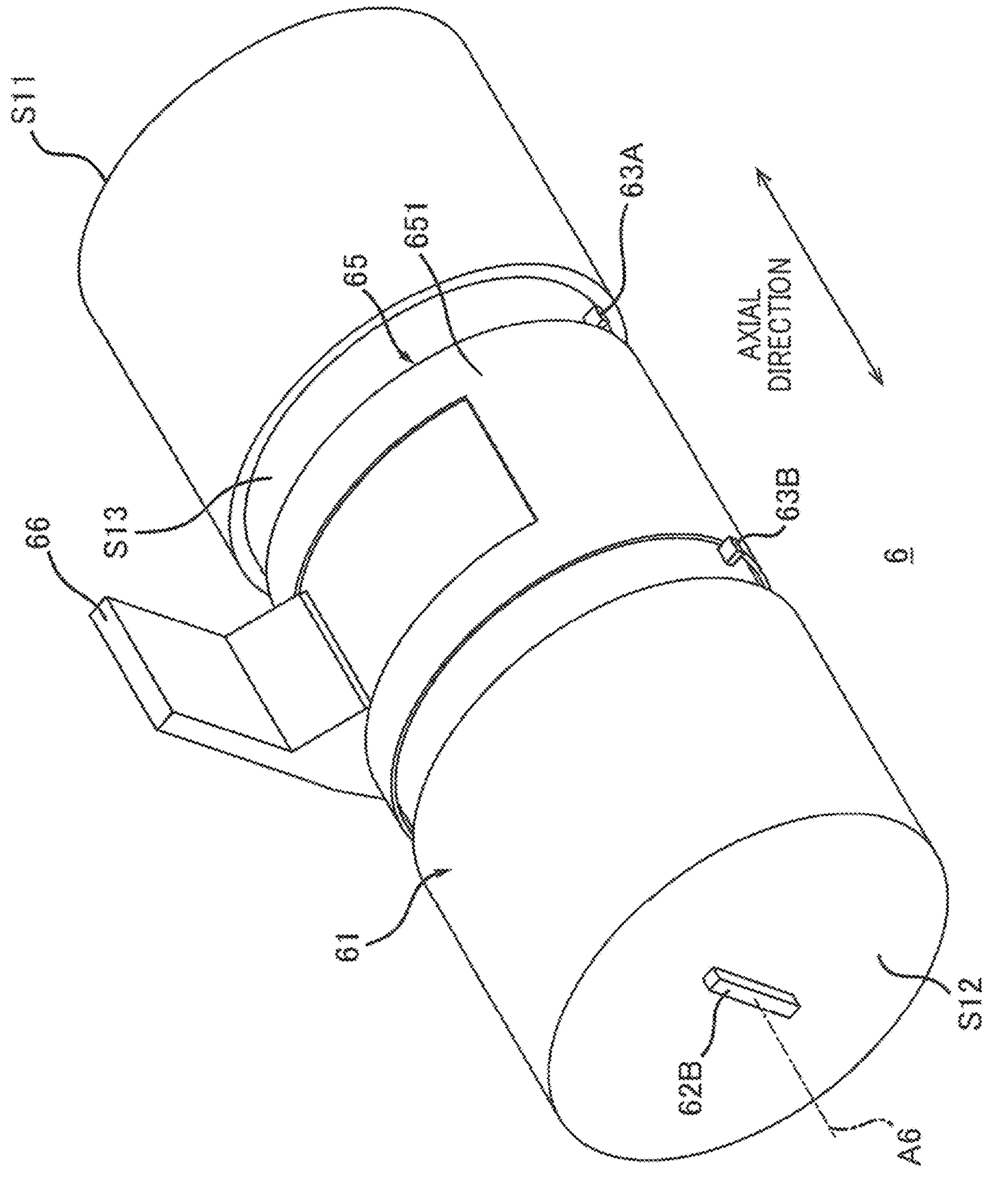
FIG. 7 is a perspective view of a toner cartridge illustrated in FIG. 1.

As illustrated in FIG. 7, the toner cartridge 6 includes the toner casing 61, a pair of protrusions 62A and 62B (also see FIG. 8), a pair of protrusions 63A and 63B, a pair of protrusions 64A and 64B (see FIG. 9), a toner shutter 65, and a handle 66. That is, the handle 66 is a part of the toner cartridge 6, and is an example of a toner cartridge of the disclosure.

3.1 Toner Casing 61

Figure 8:
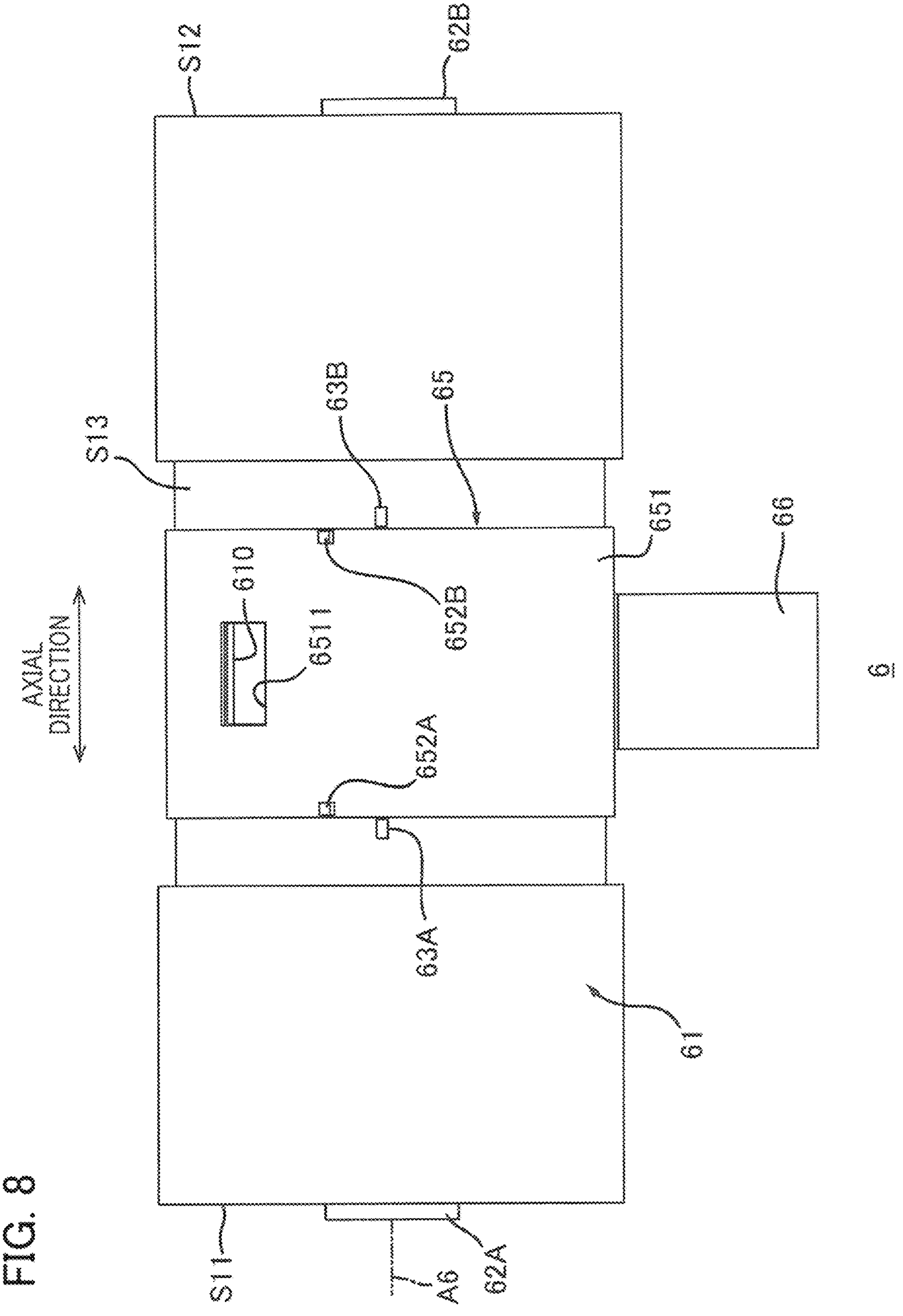
FIG. 8 is a rear view of the toner cartridge illustrated in FIG. 7.

The toner casing 61 is configured to accommodate the toner therein. The toner casing 61 extends in the axial direction. The toner casing 61 has a hollow cylindrical shape. The toner casing 61 has one side surface S11, another side surface S12 in the axial direction, and a peripheral surface S13. The peripheral surface S13 is positioned between the one side surface S11 and the other side surface S12 in the axial direction. As illustrated in FIG. 8, the toner casing 61 has a discharge opening 610. The discharge opening 610 is configured to discharge the toner accommodated in the toner casing 61. The discharge opening 610 is positioned at a center portion of the toner casing 61 in the axial direction.

3.2 Protrusions 62A, 62B

The protrusion 62A is positioned at one end of the toner casing 61 in the axial direction. The protrusion 62A is positioned at the one side surface S11 of the toner casing 61. In the present embodiment, the protrusion 62A protrudes from the one side surface S11. The protrusion 62A may be attached to the one side surface S11. The protrusion 62A extends in a direction orthogonal to the axial direction.

The protrusion 62B is positioned at another end portion of the toner casing 61 in the axial direction. The protrusion 62B is positioned apart from the protrusion 62A in the axial direction. In the present embodiment, the protrusion 62B protrudes from the other side surface S12. The protrusion 62B may be attached to the other side surface S12. As illustrated in FIG. 7, the protrusion 62B extends in the direction orthogonal to the axial direction. The protrusion 62A and the protrusion 62B extend in the same direction as each other.

3.3 Protrusions 63A, 63B

Figure 10:
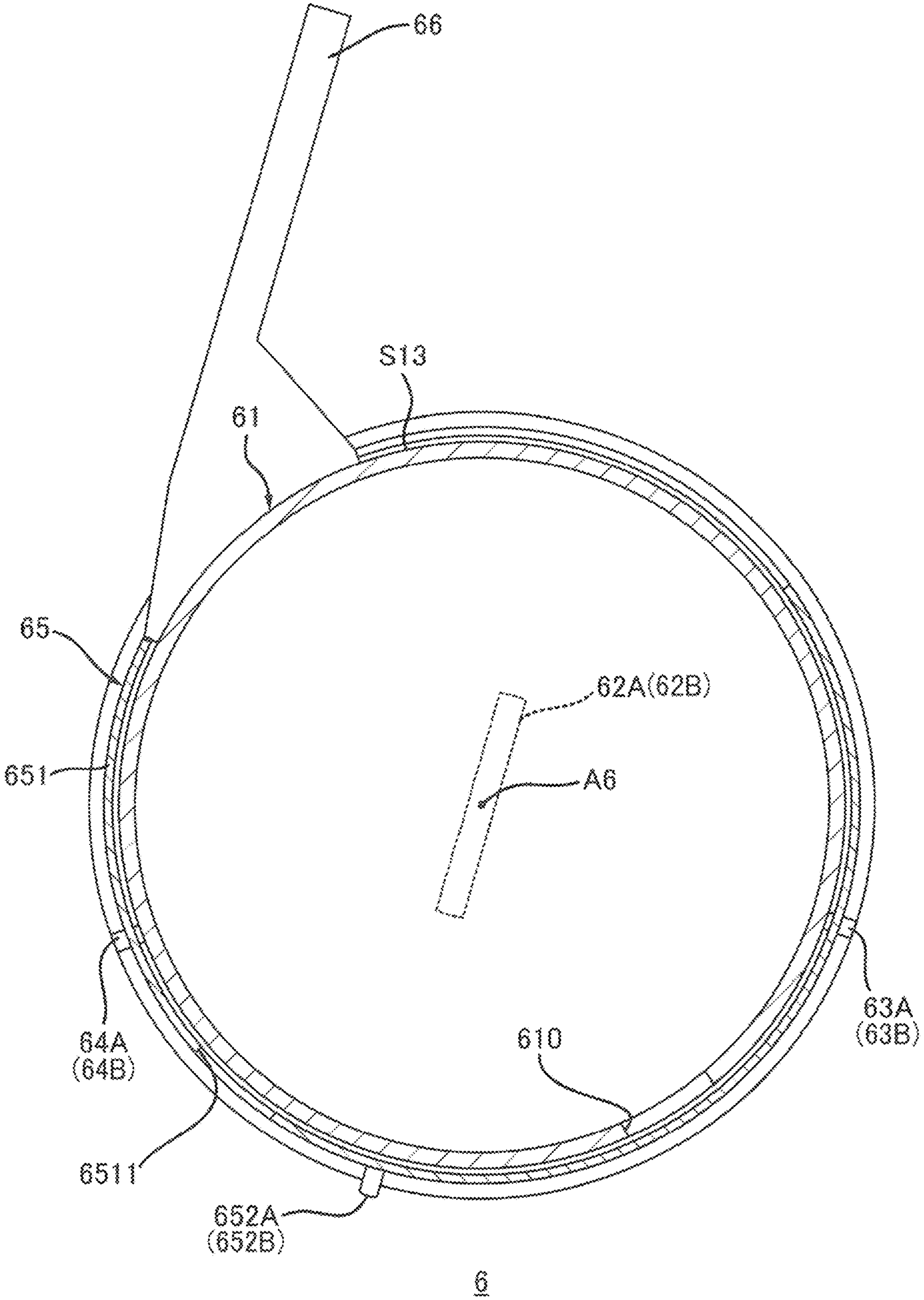
FIG. 10 is a cross-sectional view of the toner cartridge illustrated in FIG. 7.
Figure 11:
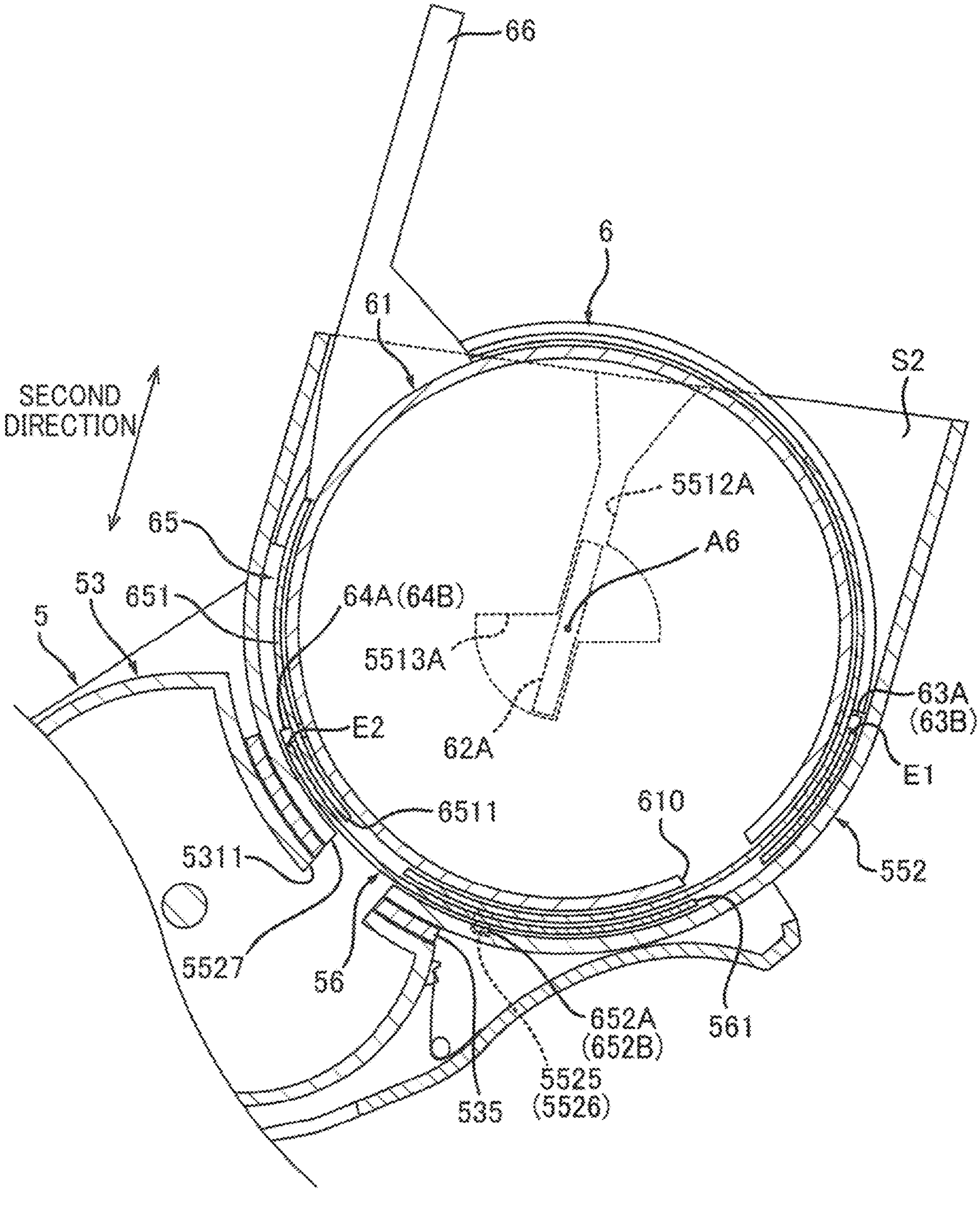
FIG. 11 is a cross-sectional view of the toner cartridge illustrated in FIG. 7 attached to the drum cartridge in a state where a handle is at a second position.

The protrusion 63A is positioned on the peripheral surface S13 of the toner casing 61. The protrusion 63A is positioned between the one side surface S11 and the discharge opening 610 (see FIG. 8) of the toner casing 61 in the axial direction. The protrusion 63A is positioned between the one side surface S11 and the toner shutter 65 in the axial direction. As illustrated in FIG. 11, in the state where the toner cartridge 6 is attached to the drum cartridge 5, the protrusion 63A is configured to face the one end E1 of the developing shutter 56 in the moving direction of the developing shutter 56. As illustrated in FIG. 10, the protrusion 63A protrudes from the peripheral surface S13. The protrusion 63A may be attached to the peripheral surface S13. The protrusion 63A extends (protrudes) in a radial direction of the toner casing 61.

As illustrated in FIG. 8, the protrusion 63B is positioned on the peripheral surface S13 of the toner casing 61. The protrusion 63B is positioned between the discharge opening 610 and the other side surface S12 of the toner casing 61 in the axial direction. The protrusion 63B is positioned between the other side surface S12 and the toner shutter 65 in the axial direction. The protrusion 63B is positioned opposite the one side surface S11 with respect to the protrusion 63A in the axial direction. As illustrated in FIG. 11, in the state where the toner cartridge 6 is attached to the drum cartridge 5, the protrusion 63B is configured to face the one end E1 (see FIG. 4) of the developing shutter 56 in the moving direction of the developing shutter 56. The protrusion 63B protrudes from the peripheral surface S13. The protrusion 63B may be attached to the peripheral surface S13. The protrusion 63B extends (protrudes) in the radial direction of the toner casing 61.

3.4 Protrusions 64A, 64B

Figure 9:
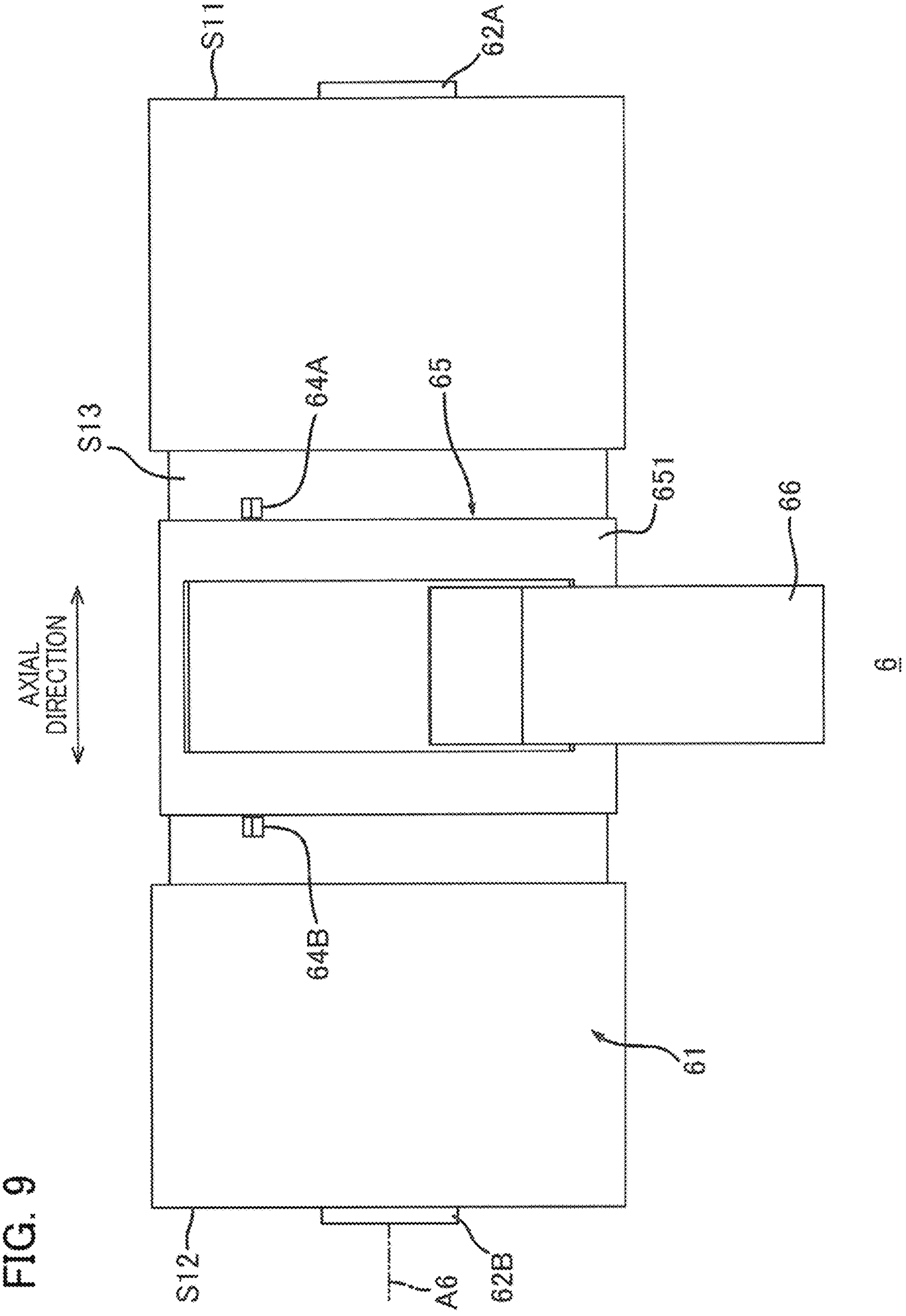
FIG. 9 is a plan view of the toner cartridge illustrated in FIG. 7.

As illustrated in FIG. 9, the protrusion 64A is positioned on the peripheral surface S13 of the toner casing 61. The protrusion 64A is positioned between the one side surface S11 and the discharge opening 610 (see FIG. 8) in the axial direction. The protrusion 64A is positioned between the one side surface S11 and the toner shutter 65 in the axial direction. As illustrated in FIG. 10, the protrusion 64A is positioned apart from the protrusion 63A in a circumferential direction of the toner casing 61. As illustrated in FIG. 11, in the state where the toner cartridge 6 is attached to the drum cartridge 5, the protrusion 64A is configured to face the other end E2 (see FIG. 4) of the developing shutter 56 in the moving direction of the developing shutter 56. As illustrated in FIG. 10, the protrusion 64A protrudes from the peripheral surface S13. The protrusion 64A may be attached to the peripheral surface S13. The protrusion 64A extends (protrudes) in the radial direction of the toner casing 61. As illustrated in FIG. 11, in the state where the toner cartridge 6 is attached to the drum cartridge 5, the protrusion 64A is positioned opposite the protrusion 63A with respect to the developing shutter 56 in the circumferential direction of the toner casing 61.

As illustrated in FIG. 9, the protrusion 64B is positioned on the peripheral surface S13 of the toner casing 61. The protrusion 64B is positioned between the discharge opening 610 (see FIG. 8) and the other side surface S12 of the toner casing 61 in the axial direction. The protrusion 64B is positioned between the other side surface S12 and the toner shutter 65 in the axial direction. The protrusion 64B is positioned opposite the one side surface S11 with respect to the protrusion 64A in the axial direction. The protrusion 64B is positioned apart from the protrusion 63B (see FIG. 7) in the circumferential direction of the toner casing 61. In the state where the toner cartridge 6 is attached to the drum cartridge 5, the protrusion 64B is configured to face the other end E2 (see FIG. 4) of the developing shutter 56 in the moving direction of the developing shutter 56. The protrusion 64B protrudes from the peripheral surface S13. The protrusion 64B may be attached to the peripheral surface S13. The protrusion 64B extends (protrudes) in the radial direction of the toner casing 61. In the state where the toner cartridge 6 is attached to the drum cartridge 5, the protrusion 64B is positioned opposite the protrusion 63B with respect to the developing shutter 56 in the circumferential direction of the toner casing 61 (see FIG. 11).

3.5 Toner Shutter 65

Figure 12:
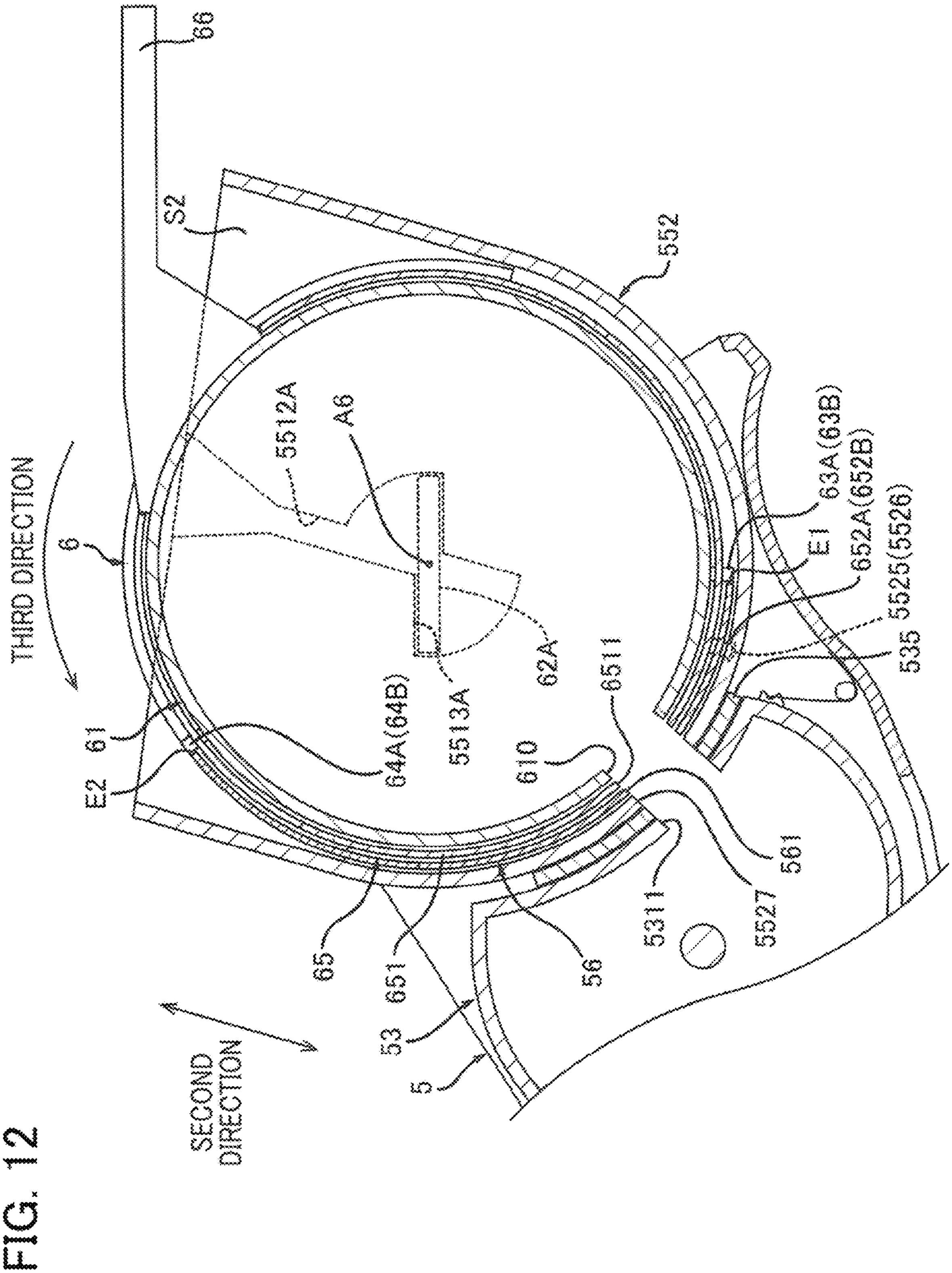
FIG. 12 is a cross-sectional view of the toner cartridge illustrated in FIG. 7 attached to the drum cartridge in a state where the handle is at a first position.

The toner shutter 65 is configured to open and close the discharge opening 610. As illustrated in FIGS. 11 and 12, the toner shutter 65 is movable between a closed position (depicted in FIG. 11) where the toner shutter 65 closes the discharge opening 610, and an open position (depicted in FIG. 12) where the toner shutter 65 opens the discharge opening 610. The toner shutter 65 is pivotable (angularly rotatable) about an axis A6 between the closed position and the open position. As illustrated in FIG. 8, the axis A6 extends in the axial direction. The toner shutter 65 includes a shutter body 651 and a pair of protrusions 652A and 652B.

3.5.1 Shutter Body 651

The shutter body 651 is positioned at a center portion of the toner cartridge 6 in the axial direction. As illustrated in FIG. 10, the shutter body 651 is positioned at the peripheral surface S13 of the toner casing 61. In the present embodiment, the shutter body 651 has a hollow cylindrical shape. The shutter body 651 has a toner shutter opening 6511.

As illustrated in FIG. 8, the toner shutter opening 6511 is positioned at a center portion of the shutter body 651 in the axial direction.

As illustrated in FIG. 11, in a state where the toner shutter 65 is at the closed position, the toner shutter opening 6511 is positioned away from the discharge opening 610. Hence, the toner shutter opening 6511 does not communicate with the discharge opening 610. Thus, the toner shutter 65 closes the discharge opening 610. As illustrated in FIG. 12, in a state where the toner shutter 65 is at the open position, the toner shutter opening 6511 is in communication with the discharge opening 610 to open the discharge opening 610. Accordingly, the inlet opening 5311 of the developing unit 53 is allowed to communicate with the discharge opening 610 through the opening 5527 of the support portion 552, the developing shutter opening 561 of the developing shutter 56, and the toner shutter opening 6511.

3.5.2 Protrusions 652A and 652B

As illustrated in FIG. 8, the protrusion 652A is positioned at one end portion of the toner shutter 65 in the axial direction. The protrusion 652A is positioned between the toner shutter opening 6511 and the one side surface S11 of the toner casing 61 in the axial direction. The protrusion 652A is positioned opposite the protrusion 63B with respect to the toner shutter opening 6511 in the axial direction. As illustrated in FIG. 10, the protrusion 652A is positioned on a peripheral surface of the shutter body 651. The protrusion 652A extends (protrudes) in a radial direction of the shutter body 651 (in the radial direction of the toner casing 61.

As illustrated in FIG. 8, the protrusion 652B is positioned at another end portion of the toner shutter 65 in the axial direction. The protrusion 652B is positioned between the toner shutter opening 6511 and the other end surface S12 of the toner casing 61 in the axial direction. The protrusion 652B is positioned opposite the protrusion 652A with respect to the toner shutter opening 6511 in the axial direction. The protrusion 652B is positioned opposite the protrusion 63A with respect to the toner shutter opening 6511 in the axial direction. The protrusion 652B extends (protrudes) in the radial direction of the toner casing 61 (in the radial direction of the shutter body 651).

3.6 Handle 66

As illustrated in FIG. 7, the handle 66 is positioned at the center portion of the toner cartridge 6 in the axial direction. As illustrated in FIG. 10, the handle 66 is positioned at the peripheral surface S13 of the toner casing 61. In the present embodiment, the handle 66 extends from the peripheral surface S13 of the toner casing 61. In the present embodiment, the handle 66 is positioned opposite the discharge opening 610 of the toner casing 61 with respect to the axis A6. The handle 66 extends in the radial direction of the toner casing 61.

3.7 Attachment of Toner Cartridge 6 to Drum Cartridge 5

In a state where the toner cartridge 6 is detached from the drum cartridge 5, the toner shutter 65 is at the closed position. As illustrated in FIG. 3, in the state where the toner cartridge 6 is detached from the drum cartridge 5, the developing shutter 56 is at the closed position.

For attaching the toner cartridge 6 to the drum cartridge 5, as illustrated in FIG. 11, a user inserts the toner cartridge 6 in the support portion 552 of the drum cartridge 5 such that the protrusions 62A, 62B (see FIG. 7) of the toner cartridge 6 are respectively fitted in the guide portions 5512A, 5512B (see FIG. 3) of the drum cartridge 5.

The toner cartridge 6 thus moves toward the developing unit 53 until the toner shutter 65 is brought into abutment with the developing shutter 56.

Upon abutment of the toner shutter 65 on the developing shutter 56, the protrusion 652A of the toner shutter 65 is engaged with the recessed portion 5525 of the support portion 552 through the slit 562A (see FIG. 4) of the developing shutter 56. Likewise, upon abutment of the toner shutter 65 on the developing shutter 56, the protrusion 652B (see FIG. 8) of the toner shutter 65 is engaged with the recessed portion 5526 (see FIG. 4) of the support portion 552 through the slit 562B (see FIG. 8) of the developing shutter 56. As such, the toner shutter 65 is fixed in position relative to the support portion 552.

Further, upon abutment of the toner shutter 65 on the developing shutter 56, the developing shutter 56 is coupled with the toner casing 61 such that the developing shutter 56 is interposed between the protrusion 63A (see FIG. 7) and the protrusion 64A (see FIG. 9) of the toner cartridge 6, and also between the protrusion 63B (see FIG. 7) and the protrusion 64B (see FIG. 9) of the toner cartridge 6. Accordingly, the developing shutter 56 is fixed in position relative to the toner casing 61.

At this time, the protrusion 62A of the toner cartridge 6 is positioned in one end portion (deep end portion) of the guide portion 5512A of the drum cartridge 5, and the protrusion 62B (see FIG. 7) of the toner cartridge 6 is positioned in one end portion (deep end portion) of the guide portion 5512B (see FIG. 3) of the drum cartridge 5. As described above, the locking portion 5513A (5513B) is positioned at one end portion of the guide portion 5512A (5512B).

As illustrated in FIGS. 11 and 12, in the state where the toner cartridge 6 is attached to the drum cartridge 5, the handle 66 is movable between a first position (depicted in FIG. 12) and a second position (depicted in FIG. 11). That is, in the state where the toner cartridge 6 is attached to the drum cartridge 5, a part of the toner cartridge 6 is movable between the first position (see FIG. 12) and the second position (see FIG. 11). In the present embodiment, the part of the toner cartridge 6 (i.e., the handle 66) is pivotally movable between the first position (FIG. 12) and the second position (FIG. 11). It should be noted here that the protrusions 63A, 63B and the protrusion 64A, 64B are also movable between positions shown in FIG. 12 and positions shown in FIG. 11 in the state where the toner cartridge 6 is attached to the drum cartridge 5. The protrusions 63A, 63B, 64A, 64B are thus another example of the part of the toner cartridge of the disclosure.

In the present embodiment, the toner casing 61 of the toner cartridge 6 is pivotable (angularly rotatable) relative to the support portion 552 of the drum cartridge 5 in accordance with the pivotal movement of the handle 66 between the first position (FIG. 12) and the second position (FIG. 11).

As illustrated in FIG. 11, in a state where the toner cartridge 6 is attached to the drum cartridge 5 and the handle

66 is at the second position, the developing shutter 56 is at the closed position and the toner shutter 65 is at the closed position.

As illustrated in FIG. 12, as the user moves the handle 66 from the second position to the first position from the state of FIG. 11, the toner casing 61 angularly rotates to move the developing shutter 56 from the closed position to the open position.

At this time, the toner casing 61 angularly rotates relative to the toner shutter 65 that is fixed to the support portion 552. As such, the toner shutter 65 moves, relative to the toner casing 61, from the closed position to the open position.

As illustrated in FIG. 12, in a state where the toner cartridge 6 is attached to the drum cartridge 5 and the handle 66 is at the first position, the protrusion 62A is fitted with the locking portion 5513A, and the protrusion 62B is fitted with the locking portion 5513B (see FIG. 3). Accordingly, the toner cartridge 6 is locked relative to the drum cartridge 5. In other words, in the state where the toner cartridge 6 is attached to the drum cartridge 5 and the part of the toner cartridge 6 is at the first position, the toner cartridge 6 cannot be detached from the drum cartridge 5.

In the state where the toner cartridge 6 is attached to the drum cartridge 5 and the handle 66 is at the first position, the developing shutter 56 is at the open position and the toner shutter 65 is at open position.

As illustrated in FIGS. 11 and 12, in accordance with the user's operation to move the handle 66 from the first position (see FIG. 12) to the second position (see FIG. 11), the developing shutter 56 moves from the open position to the closed position and the toner shutter 65 moves, relative to the toner casing 61, from the open position to the closed position. The toner cartridge 6 has a part moving from the first position (see FIG. 12) to the second position (see FIG. 11) in a third direction crossing the first direction and the second direction as indicated in FIG. 12.

As illustrated in FIG. 11, in the state where the toner cartridge 6 is attached to the drum cartridge 5 and the handle 66 is at the second position, the protrusion 62A is disengaged from the locking portion 5513A, and the protrusion 62B (see FIG. 7) is disengaged from the locking portion 5513B (see FIG. 3). Accordingly, the toner cartridge 6 is unlocked from the drum cartridge 5. That is, in the state where the toner cartridge 6 is attached to the drum cartridge 5 and the part of the toner cartridge 6 is at the second position, the toner cartridge 6 is detachable from the drum cartridge 5.

4. Details of Image Forming Apparatus 1

The image forming apparatus 1 will be described in detail with reference to FIGS. 1, 3, and 13 through 15.

Figure 13:
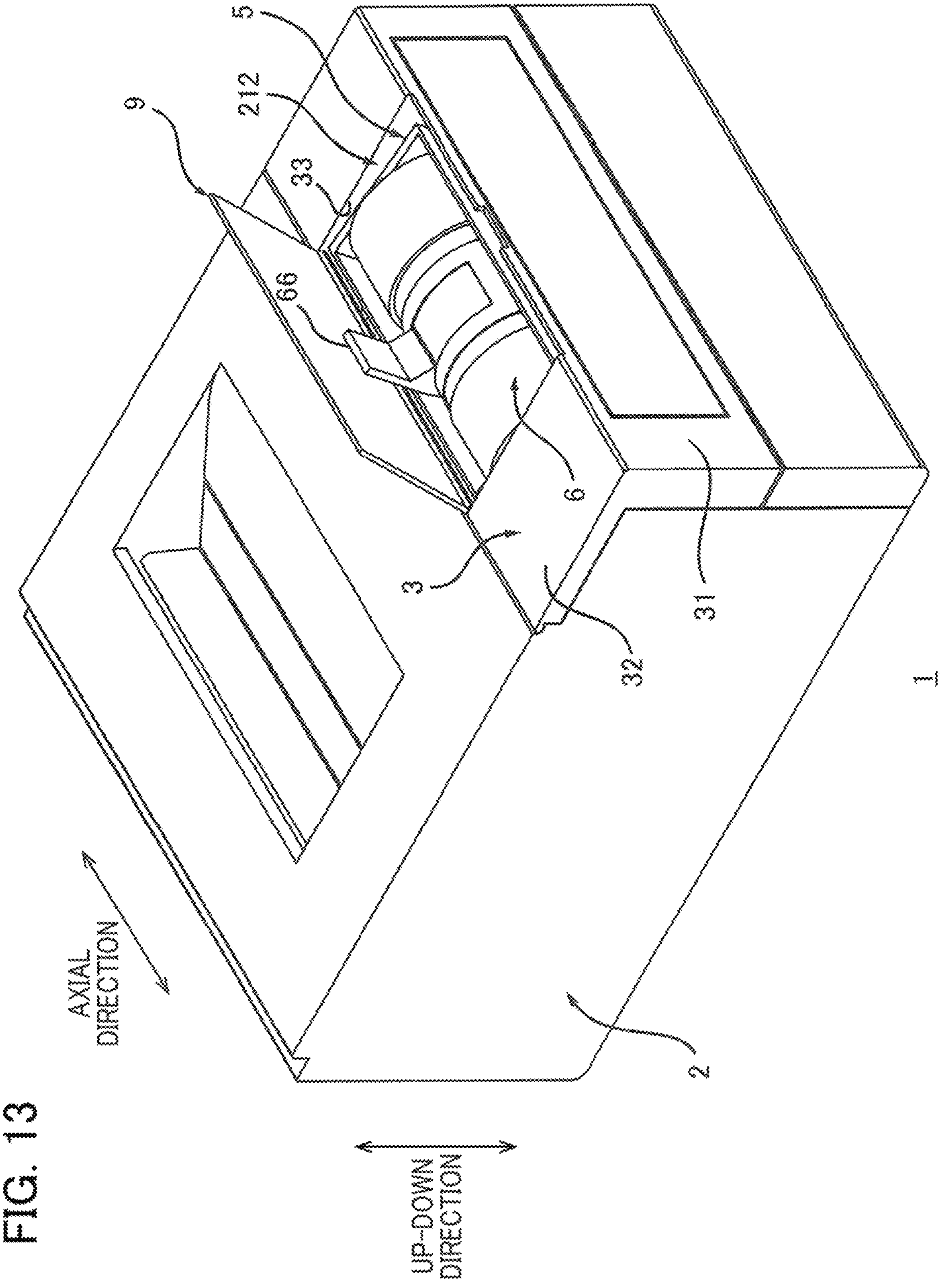
FIG. 13 is perspective view of the image forming apparatus illustrated in FIG. 1 in a state where a second cover is at a second open position.

As illustrated in FIG. 13, the image forming apparatus 1 further includes a second cover 9, in addition to the housing 2 and the first cover 3 described above.

4.1 Housing 2

As illustrated in FIG. 2, the housing 2 has a pair of guides 22A and 22B, another pair of guides 23A and 23B, and a pair of stoppers 24A and 24B.

The guide 22A, the guide 23A, and the stopper 24A are provided at one of side walls of the housing 2 in the axial direction. The guide 22B, the guide 23B, and the stopper 24B are provided in a remaining one of the side walls of the housing 2 in the axial direction. A positional relationship among the guide 22B, the guide 23B, and the stopper 24B is identical to that among the guide 22A, the guide 23A, and the stopper 24A.

4.1.1 Guides 22A, 22B, 23A and 23B

The guide 22A extends in the first direction. In the present embodiment, the guide 22A is a groove. The guide 22A is configured to guide the drum cartridge 5 for attachment of the drum cartridge 5 to the housing 2. Specifically, the guide 22A is configured to guide the protrusion 57A of the drum cartridge 5 for attachment of the drum cartridge 5 to the housing 2.

The guide 22B extends in the first direction. In the present embodiment, the guide 22B is a groove. The guide 22B is configured to guide the drum cartridge 5 for attachment of the drum cartridge 5 to the housing 2. Specifically, the guide 22B is configured to guide the protrusion 57B (see FIG. 4) of the drum cartridge 5 for attachment of the drum cartridge 5 to the housing 2.

The guide 23A is positioned apart from the guide 22A. The guide 23A extends in the first direction. In the present embodiment, the guide 23A is a groove. The guide 23A is configured to guide the drum cartridge 5 for attachment of the drum cartridge 5 to the housing 2. Specifically, the guide 23A is configured to guide the protrusion 58A of the drum cartridge 5 for attachment of the drum cartridge 5 to the housing 2.

The guide 23B is positioned apart from the guide 22B. The guide 23B extends in the first direction. In the present embodiment, the guide 23B is a groove. The guide 23B is configured to guide the drum cartridge 5 for attachment of the drum cartridge 5 to the housing 2. Specifically, the guide 23B is configured to guide the protrusion 58B (see FIG. 4) of the drum cartridge 5 for attachment of the drum cartridge 5 to the housing 2.

4.1.2 Stoppers 24A, 24B

The stopper 24A is positioned at one end portion (deep end portion) of the guide 23A in the first direction. The stopper 24A extends in a direction crossing the first direction. In the present embodiment, the stopper 24A extends in a direction orthogonal to an up-down direction. In the present embodiment, the stopper 24A is a groove. In the state where the drum cartridge 5 is attached to the housing 2, the protrusion 58A of the drum cartridge 5 is fitted with the stopper 24A. In other words, the protrusion 58A is fitted with the groove in the state where the drum cartridge 5 is attached to the housing 2.

The stopper 24B is positioned at one end portion (deep end portion) of the guide 23B in the first direction. The stopper 24B extends in a direction crossing the first direction. In the present embodiment, the stopper 24B extends in the direction orthogonal to the up-down direction. The stoppers 24A and 24B extend in the same direction as each other. In the present embodiment, the stopper 24B is a groove. In the state where the drum cartridge 5 is attached to the housing 2, the protrusion 58B of the drum cartridge 5 is fitted with the stopper 24B (groove).

4.2 First Cover 3

As illustrated in FIG. 13, the first cover 3 is positioned at another end portion of the housing 2 in the first direction. The first cover 3 includes a first plate 31 and a second plate 32. The first cover 3 has a first cover opening 33.

4.2.1 First Plate 31

In the state where the first cover 3 is at the first closed position as illustrated in FIG. 13, the first plate 31 extends in the up-down direction.

4.2.2 Second Plate 32

In the state where the drum cartridge 5 is attached to the housing 2 and the first cover 3 is at the first closed position, the second plate 32 is positioned above the support portion 552 (see FIG. 1) of the drum cartridge 5. In the state where the drum cartridge 5 is attached to the housing 2 and the first cover 3 is at the first closed position, the second plate 32 extends in a horizontal direction.

4.2.3 First Cover Opening 33

In the present embodiment, the first cover opening 33 is positioned at a center portion of the second plate 32 in the axial direction. In the state where the first cover 3 is at the first closed position, the first cover opening 33 defines a second region 212 of the opening 21 (see FIG. 2). The first cover opening 33 is smaller than the opening 21 (see FIG. 2). In other words, the second region 212 is smaller than the opening 21 (see FIG. 2). As such, the second region 212 is smaller than the first region 211 corresponding to the entire region of the opening 21 (see FIG. 2).

The first cover opening 33 is smaller than the drum cartridge 5. In the present embodiment, the first cover opening 33 has a size shorter than a size of the drum cartridge 5 in the axial direction. With this configuration, the drum cartridge 5 cannot pass through the first cover opening 33. In other words, the drum cartridge 5 cannot pass through the second region 212 of the opening 21.

Incidentally, with respect to the axial direction, the second region 212 need not be shorter in size than the drum cartridge 5 and longer than the toner cartridge 6, provided that the second region 212 may be so sized that the drum cartridge 5 cannot pass through the second region 212. For example, while the second region 212 may be longer in size than the drum cartridge 5 in the axial direction, the second region 212 may be shorter in size than the drum cartridge 5 but longer than the toner cartridge 6 with respect to the direction orthogonal to the axial direction.

The first cover opening 33 has a size larger than the toner cartridge 6, so that the toner cartridge 6 can pass through the first cover opening 33. As such, the toner cartridge 6 can pass through the second region 212 of the opening 21 (see FIG. 2).

4.2.4 Second Cover 9

Figure 14:
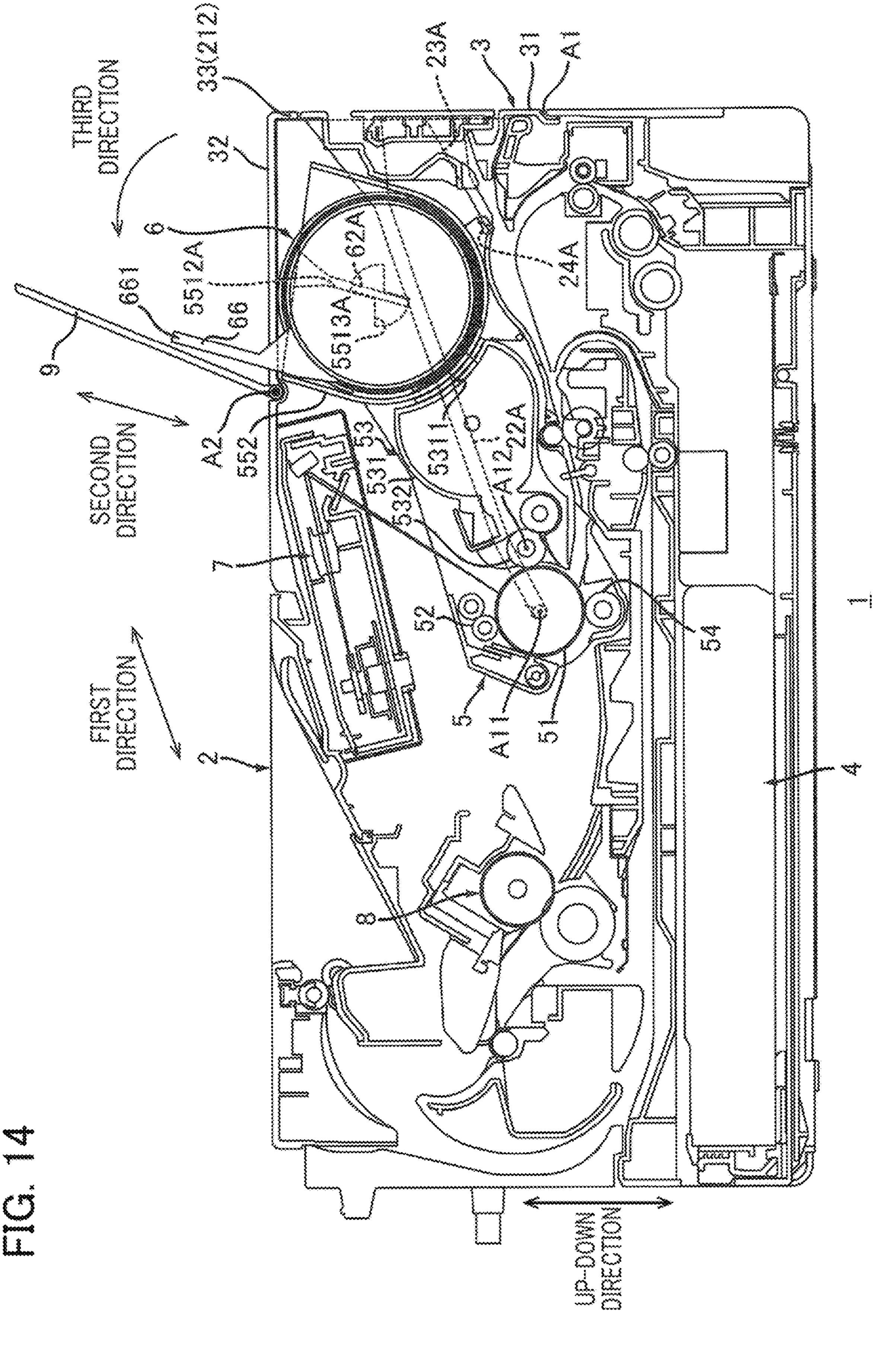
FIG. 14 is a cross-sectional view of the image forming apparatus illustrated in FIG. 13 in a state where the second cover is at the second open position and the handle is at the second position.

The second cover 9 is attached to the first cover 3. As illustrated in FIGS. 1 and 14, the second cover 9 is movable between a second closed position (see FIG. 1) and a second open position (see FIG. 14). As illustrated in FIG. 1, in a state where the second cover 9 is at the second closed position, the second cover 9 closes the first cover opening 33. That is, in a state where the first cover 3 is at the first closed position and the second cover 9 is at the second closed position, the second cover 9 closes the second region 212 (see FIG. 13) of the opening 21 (see FIG. 2). The opening 21 (see FIG. 2) is closed by the first cover 3 at the first closed position and the second cover 9 at the second closed position. As illustrated in FIG. 14, in a state where the second cover 9 is at the second open position, the first cover opening 33 is opened. In other words, in a state where the first cover 3 is at the first closed position and the second cover 9 is at the second open position, the second region 212 of the opening 21 is opened.

As illustrated in FIGS. 1 and 14, the second cover 9 is pivotally movable about a second axis A2 between the second closed position (see FIG. 1) and the second open position (see FIG. 14). In the state where the first cover 3 is at the first closed position, the second axis A2 is positioned above the first axis A1. The second axis A2 extends in a direction coincident with an extending direction of the first axis A1 (i.e., the axial direction). In the state where the second cover 9 is at the second closed position, the second cover 9 extends in the direction orthogonal to the up-down direction.

5. Attachment and Detachment of Drum Cartridge 5.

5.1 Attachment of Drum Cartridge 5

As illustrated in FIG. 2, in a state where the first cover 3 is at the first open position and the opening 21 of the housing 2 is opened, a user inserts the drum cartridge 5 into the interior of the housing 2 through the opening 21.

The drum cartridge 5 is being moved in the first direction while the protrusion 57A of the drum cartridge 5 is guided by the guide 22A, the protrusion 57B is guided by the guide 22B, the protrusion 58A is guided by the guide 23A, and the protrusion 58B is guided by the guide 23B.

The protrusion 58A is then fitted with the stopper 24A and the protrusion 58B is fitted with the stopper 24B. The attachment of the drum cartridge 5 to the housing 2 is thus completed.

5.2 Detachment of Drum Cartridge 5

As illustrated in FIG. 1, in the state where the drum cartridge 5 is attached to the housing 2, the protrusion 57A (see FIG. 4) of the drum cartridge 5 is fitted with the guide 22A; the protrusion 57B (see FIG. 4) is fitted with the guide 22B; the protrusion 58A (see FIG. 4) is fitted with the stopper 24A (see FIG. 2); and the protrusion 58B (see FIG. 4) is fitted with the stopper 24B.

In accordance with a user's operation to move the first cover 3 from the first closed position (FIG. 1) to the first open position (FIG. 2), the drum cartridge 5 is exposed to the outside of the housing 2. At this time, the stoppers 24A, 24B (see FIG. 2) restrict the respective protrusions 58A, 58B (see FIG. 4) of the drum cartridge 5 from moving in the direction crossing the first direction. Hence, a user can pull out the drum cartridge 5 in the first direction along the guides 22A, 22B, and the guides 23A, 23B.

6. Attachment and Detachment of Toner Cartridge 6 Relative to Drum Cartridge 6

6.1 Detachment of Toner Cartridge 6

Figure 15:
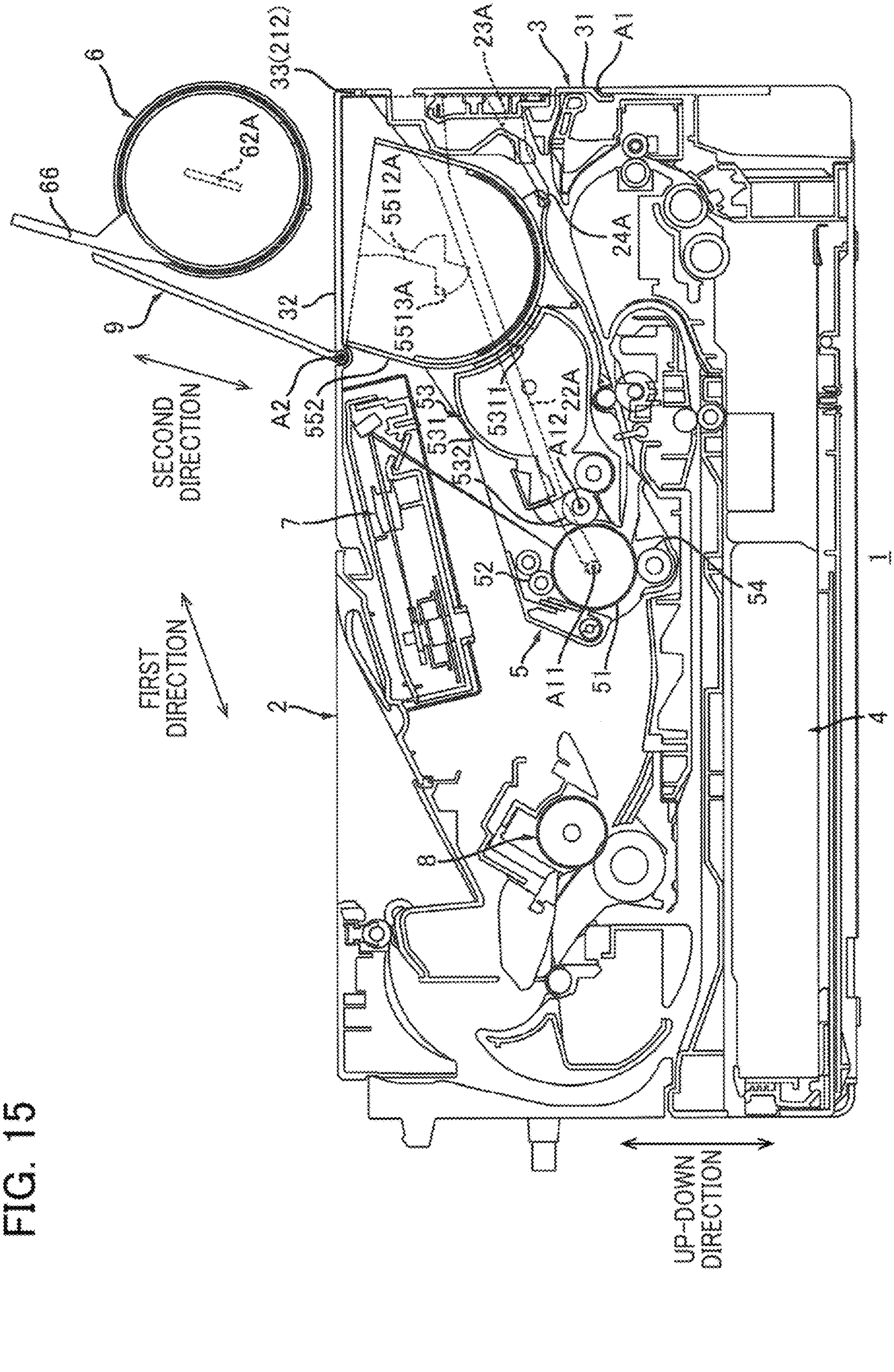
FIG. 15 is a cross-sectional view of the image forming apparatus illustrated in FIG. 13 in a state where the toner cartridge illustrated in FIG. 7 is detached from the drum cartridge attached to the housing.

Referring to FIGS. 1, 14 and 15, attachment and detachment of the toner cartridge 6 to and from the drum cartridge 6 will be described.

As illustrated in FIG. 1, in a state where: the drum cartridge 5 is attached to the housing 2; the toner cartridge 6 is attached to the drum cartridge 5; the first cover 3 is at the first closed position; and the handle 66 is at the first position, the handle 66 does not protrude out from the second region 212 (see FIG. 1) of the opening 21. In a state where: the drum cartridge 5 is attached to the housing 2; the toner cartridge 6 is attached to the drum cartridge 5; the first cover 3 is at the first closed position; the handle 66 is at the first position; and the second cover 9 is at the second closed position, an end portion 661 of the handle 66 is exposed to the outside through a gap between the first cover 3 and the second cover 9 as illustrated in FIG. 1.

In a state where: the drum cartridge 5 is attached to the housing 2; the toner cartridge 6 is attached to the drum cartridge 5; the first cover 3 is at the first closed position; and the second cover 9 is at the second closed position, a user can grab the end portion 661 of the handle 66 to move the handle 66 from the first position (see FIG. 1) toward the second position (see FIG. 14).

In accordance with the user's operation to the handle 66, the second cover 9 is pushed by the handle 66 to move from the second closed position to the second open position, as illustrated in FIG. 14. That is, in accordance with the movement of the handle 66 from the first position to the second position in a state where the handle 66 is at the first position and the second cover 9 is at the second closed position, the second cover 9 is pushed by the handle 66 to move from the second closed position to the second open position, thereby opening the first cover opening 33.

In a state where: the drum cartridge 5 is attached to the housing 2; the toner cartridge 6 is attached to the drum cartridge 5; the first cover 3 is at the first closed position; the second cover 9 is at the second open position; and the handle 66 is at the second position, the handle 66 protrudes out from the second region 212. That is, in the state where: the drum cartridge 5 is attached to the housing 2; the toner cartridge 6 is attached to the drum cartridge 5; the first cover 3 is at the first closed position; the handle 66 is at the second position; and the second cover 9 is at the second open position, a part of the toner cartridge 6 (end portion 661) protrudes out from the second region 212. Incidentally, the user may move the handle 66 from the first position (FIG. 1) to the second position (FIG. 14) after moving the second cover 9 from the second closed position to the second open position.

At this time, the stoppers 24A, 24B restrict the drum cartridge 5 from moving following the movement of the handle 66 manipulated by the user. In other words, the stoppers 24A, 24B restrict the drum cartridge 5 from moving in the third direction when a part of the toner cartridge 6 (handle 66) moves from the first position to the second position in the state where the drum cartridge 5 is attached to the housing 2.

In the state where the handle 66 is at the second position, the developing shutter 56 of the drum cartridge 5 is at the closed position, and the toner shutter 65 of the toner cartridge 6 is at the closed position, as described above. In other words, in the state where the toner cartridge 6 is attached to the drum cartridge 5 and the part of the toner cartridge 6 is at the second position, the developing shutter 56 closes the inlet opening 5311 (see FIG. 11) and the toner shutter 65 closes the discharge opening 610 (see FIG. 11).

Next, as illustrated in FIG. 14, the user grabs the handle 66 in the state where the handle 66 is at the second position, and pulls out the toner cartridge 6 in the second direction.

At this time, as illustrated in FIG. 15, the toner cartridge 6 is detached from the drum cartridge 5 through the first cover opening 33 in the state where the drum cartridge 5 is attached to the housing 2. In other words, the toner cartridge 6 is attachable to and detachable from the drum cartridge 5 in the second direction, through the second region 212, in the state where the first cover 3 is at the first closed position, the second cover 9 is at the second open position, and the part of the toner cartridge 6 is at the second position.

6.2 Attachment of Toner Cartridge 6

As illustrated in FIGS. 14 and 15, the user inserts the toner cartridge 6, through the first cover opening 33, into the support portion 552 of the drum cartridge 5 in the state where the drum cartridge 5 is attached to the housing 2, the first cover 3 is at the first closed position, and the second cover 9 is at the second open position. In this way, the toner cartridge 6 is attached to the support portion 552 of the drum cartridge 5.

At this time, the handle 66 of the toner cartridge 6 is at the second position. When the handle 66 is at the second position, the handle 66 protrudes out from the first cover opening 33.

The user then moves the handle 66 from the second position to the first position.

In accordance with the user's operation to move the handle 66 from the second position to the first position, the inlet opening 5311 of the developing unit 53 is opened (see FIG. 12) and the discharge opening 610 of the toner cartridge 6 is opened (see FIG. 12), as described above. In other words, as illustrated in FIG. 12, the developing shutter 56 opens the inlet opening 5311 (the developing shutter opening 561 of the developing shutter 56 is in communication with the inlet opening 5311), and the toner shutter 65 opens the discharge opening 610 (the toner shutter opening 6511 of the toner shutter 65 is in communication with the discharge opening 610) in the state where the toner cartridge 6 is attached to the drum cartridge 5 and the part of the toner cartridge 6 is at the first position.

The user then moves the second cover 9 from the second open position (FIG. 13) to the second closed position (FIG. 1).

7. Operations and Technical Advantages of Embodiment (1) In the image forming apparatus 1 according to the present embodiment, as illustrated in FIG. 2, the first region 211 of the opening 21 of the housing 2 is opened in the state where the first cover 3 is at the first open position.

Accordingly, a user can pull out the drum cartridge 5 in the first direction from the housing 2 through the first region 211 of the opening 21 of the housing 2.

In contrast, in the state where the first cover 3 is at the first closed position and the second cover 9 is at the second open position, the first region 211 of the opening 21 of the housing 2 is closed by the first cover 3, and the second region 212 of the opening 21 of the housing 2 is opened by the second cover 9, as illustrated in FIG. 14.

The user cannot detach the drum cartridge 5 from the housing 2 since the first region 211 is closed, but the user can detach the toner cartridge 6 from the drum cartridge 5 in the second direction through the second region 212 since the second region 212 is not covered by the second cover 9.

With this structure, in a case where a user attempts to detach the toner cartridge 6 from the drum cartridge 5 without detachment of the drum cartridge 5 from the housing 2 in the state where the drum cartridge 5 is attached to the housing 2 and the toner cartridge 6 is attached to the drum cartridge 5, the user can pull out the toner cartridge 6 without accidental detachment of the drum cartridge 5 from the housing 2.

Further, according to the image forming apparatus 1 of the present embodiment, in the state where the toner cartridge 6 is attached to the drum cartridge 5, the toner cartridge 6 cannot be detached from the drum cartridge 5 when the part of the toner cartridge 6 (the handle 66, or the protrusions 63A, 63B, 64A, 64B) is at the first position, but the toner cartridge 6 is detachable from the drum cartridge 5 when the part of the toner cartridge 6 (the handle 66, or the protrusions 63A, 63B, 64A, 64B) is at the second position.

Here, for a comparative purpose, assume a case where the direction in which the part of the toner cartridge 6 (the handle 66, or the protrusions 63A, 63B, 64A, 64B) moves from the first position to the second position is coincident with the first direction, i.e., the attachment/detachment direction of the drum cartridge 5 relative to the housing 2). In this comparative case, the drum cartridge 5 may move in the first direction following the user's operation to move the part of the toner cartridge 6 (the handle 66, or the protrusions 63A, 63B, 64A, 64B) from the first position to the second position.

If the drum cartridge 5 moves in the first direction during the user's operation to pull out the toner cartridge 6 from the drum cartridge 5, the drum cartridge 5 may come into abutment with the first cover 3 at the first closed position, which may possibly cause the first cover 3 to move toward the open position.

If the first cover 3 is opened during the user's operation to detach the toner cartridge 6 from the drum cartridge 5, the user's detachment of the toner cartridge 6 from the drum cartridge 5 may result in accidental detachment of the drum cartridge 5 from the housing 2.

To this effect, according to the image forming apparatus 1 of the present embodiment, the direction in which the part of the toner cartridge 6 (the handle 66 or the protrusions 63A, 63B, 64A, 64B) moves from the first position to the second position (i.e., the third direction) crosses the direction in which the drum cartridge 5 is attached and detached relative to the housing 2 (i.e., the first direction).

With this configuration of the embodiment, the user's operation to move the part of the toner cartridge 6 from the first position to the second direction is less likely to cause unintentional movement of the drum cartridge 5 in the first direction.

Accordingly, an accidental opening of the first cover 3 is less likely to occur during the user's operation to detach the toner cartridge 6 from the drum cartridge 5. Hence, the configuration of the embodiment can restrain accidental detachment of the drum cartridge 5 from the housing 2 as a result of the user's operation to detach the toner cartridge 6 from the drum cartridge 5 that is attached to the housing 2.

(2) According to the image forming apparatus 1 of the embodiment, the drum cartridge 5 cannot pass through the second region 212 which is smaller in size than the first region 211.

With this configuration, the user cannot pull out the drum cartridge 5 from the housing 2 through the second region 212 in the state where the drum cartridge 5 is attached to the housing 2, the toner cartridge 6 is attached to the drum cartridge 5, the first cover 3 is at the first closed position, and the second cover 9 is at the second open position.

Accordingly, the user can remove the toner cartridge 6 without accidental detachment of the drum cartridge 5 from the housing 2.

(3) According to the image forming apparatus 1, the second cover 9 cannot be located at the second closed position, in the state where the drum cartridge 5 is attached to the housing 2, the toner cartridge 6 is attached to the drum cartridge 5, the handle 66 is at the second position, and the first cover 3 is at the first closed position, as illustrated in FIG. 14. Hence, this configuration of the embodiment can prompt the user to move the handle 66 from the second position to the first position in order to close the second region 212 by the second cover 9.

(4) According to the image forming apparatus 1, the handle 66 is accessible to the user in the state where the second cover 9 is at the second closed position, as illustrated in FIG. 1.

(5) According to the image forming apparatus 1, the user's single operation to move the handle 66 from the first position to the second position can realize both of: moving the second cover 9 from the second closed position to the second open position; and making the toner cartridge 6 detachable from the drum cartridge 5, as illustrated in FIG. 14.

(6) According to the image forming apparatus 1, the part of the toner cartridge 6 (the handle 66) is movable from the first position to the second position while the drum cartridge 5 is kept immovable relative to the housing 2.

(7) According to the image forming apparatus 1, as illustrated in FIG. 12, the inlet opening 5311 and the discharge opening 610 are opened in response to the movement of the part of the toner cartridge 6 (the handle 66) from the second position to the first position by a user who is trying to close the second region 212 of the opening 21 by the second cover 9. This configuration can reduce a likelihood that the user may close the second region 212 (see FIG. 13) without opening the inlet opening 5311 and the discharge opening 610.

On the other hand, as illustrated in FIG. 11, the developing shutter 56 closes the inlet opening 5311 and the toner shutter 65 closes the discharge opening 610 in response to the movement of the part of the toner cartridge 6 (the handle 66) from the first position to the second position by a user who attempts to open the second region 212 of the opening 21. Hence, this configuration can restrain leakage of the toner out of the toner casing 61 through the discharge opening 610 during the detachment of the toner cartridge 6 from the drum cartridge 5 that is attached to the housing 2.

8. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Hereinafter, a modification to the embodiment described above will be described with reference to FIGS. 16 through 19. In the following modification, like parts and components will be designated by the same reference numbers as those of the embodiment and descriptions therefor will be omitted to avoid duplicating description.

In the above-described embodiment, the toner cartridge 6 is attachable to and detachable from the drum flame 55 of the drum cartridge 5. Alternatively, the toner cartridge 6 may be detachably attachable to the developing unit 53 of the drum cartridge 5, as in the present modification.

Figure 16:
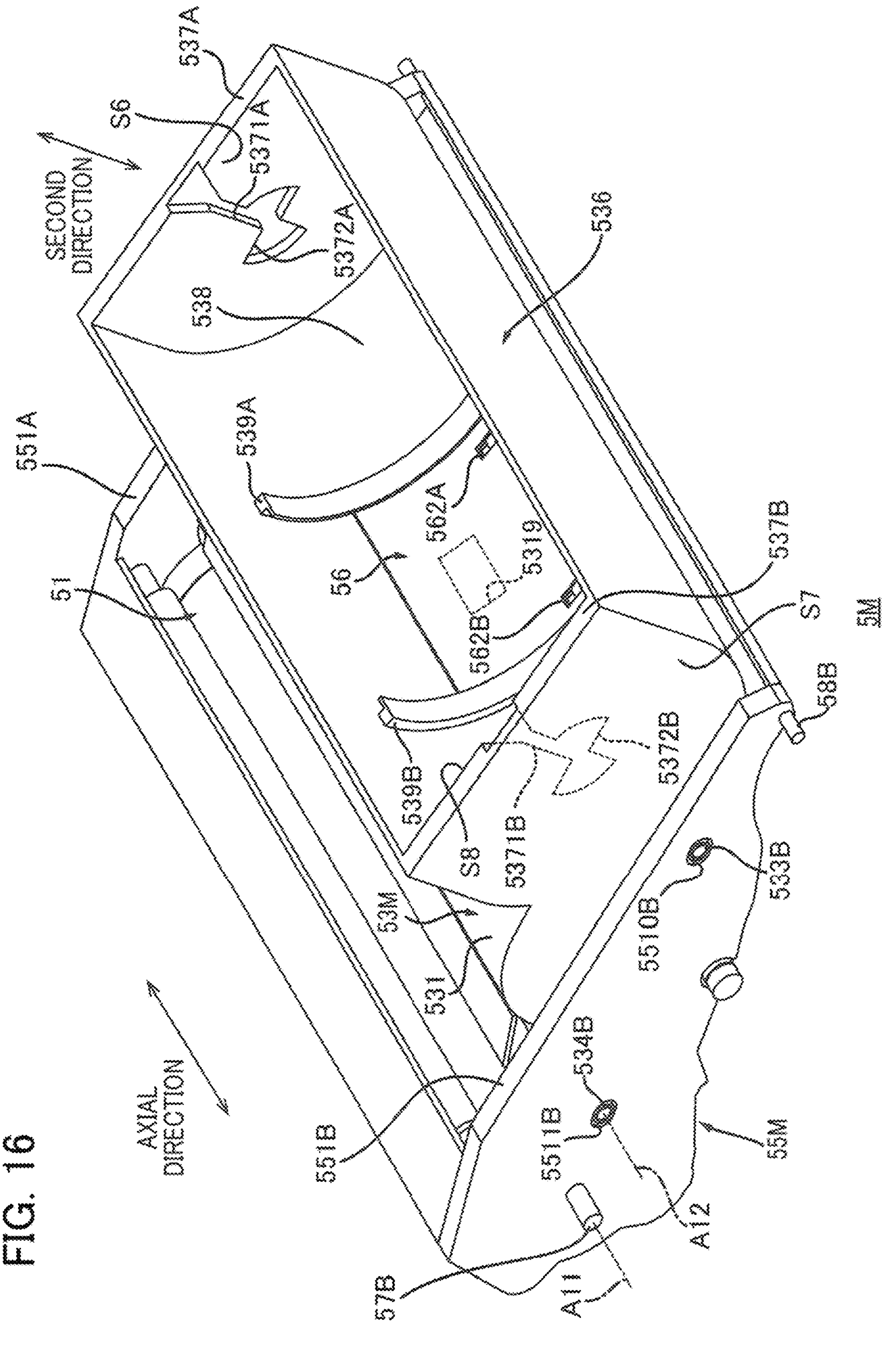
FIG. 16 is a perspective view of a drum cartridge of an image forming apparatus according to a modification to the embodiment.

Specifically, a drum cartridge 5M according to the modification includes a drum frame 55M and a developing unit 53M. As illustrated in FIG. 16, the developing unit 53M according to the modification includes a support portion 536, in addition to the developing housing 531, the developing roller 532 (FIG. 17), the two protrusions 533A, 534A, and two protrusions 533B, 534B described above. The developing unit 53M according to the modification does not include the sealing member 535 of the above-described embodiment. The drum flame 55M of the drum cartridge 5M does not include the support portion 552 of the above-described embodiment.

8.1 Support Portion 536

The support portion 536 is positioned opposite the photosensitive drum 51 with respect to the developing housing 531 in the direction connecting the drum axis A11 and the developing axis A12. The support portion 536 is connected to (integral with) the developing housing 531. The support portion 536 may be attached to the developing housing 531. The support portion 536 extends in the axial direction. The support portion 536 has a box-liked shape. The support portion 536 is configured to receive the toner cartridge 6 therein. Specifically, the support portion 536 includes a pair of support side plates 537A and 537B, and a bottom plate 538.

8.1.1 Support Side Plates 537A and 537B

The support side plate 537A constitutes one end portion of the support portion 536 in the axis direction. The support side plate 537A extends in a direction crossing the axial direction. Preferably, the support side plate 537A extends in the direction orthogonal to the axial direction. The support side plate 537A has an outer surface S5 (FIG. 17) and an inner surface S6. The support side plate 537A has a guide portion 5371A and a lock portion 5372A.

Figure 18:
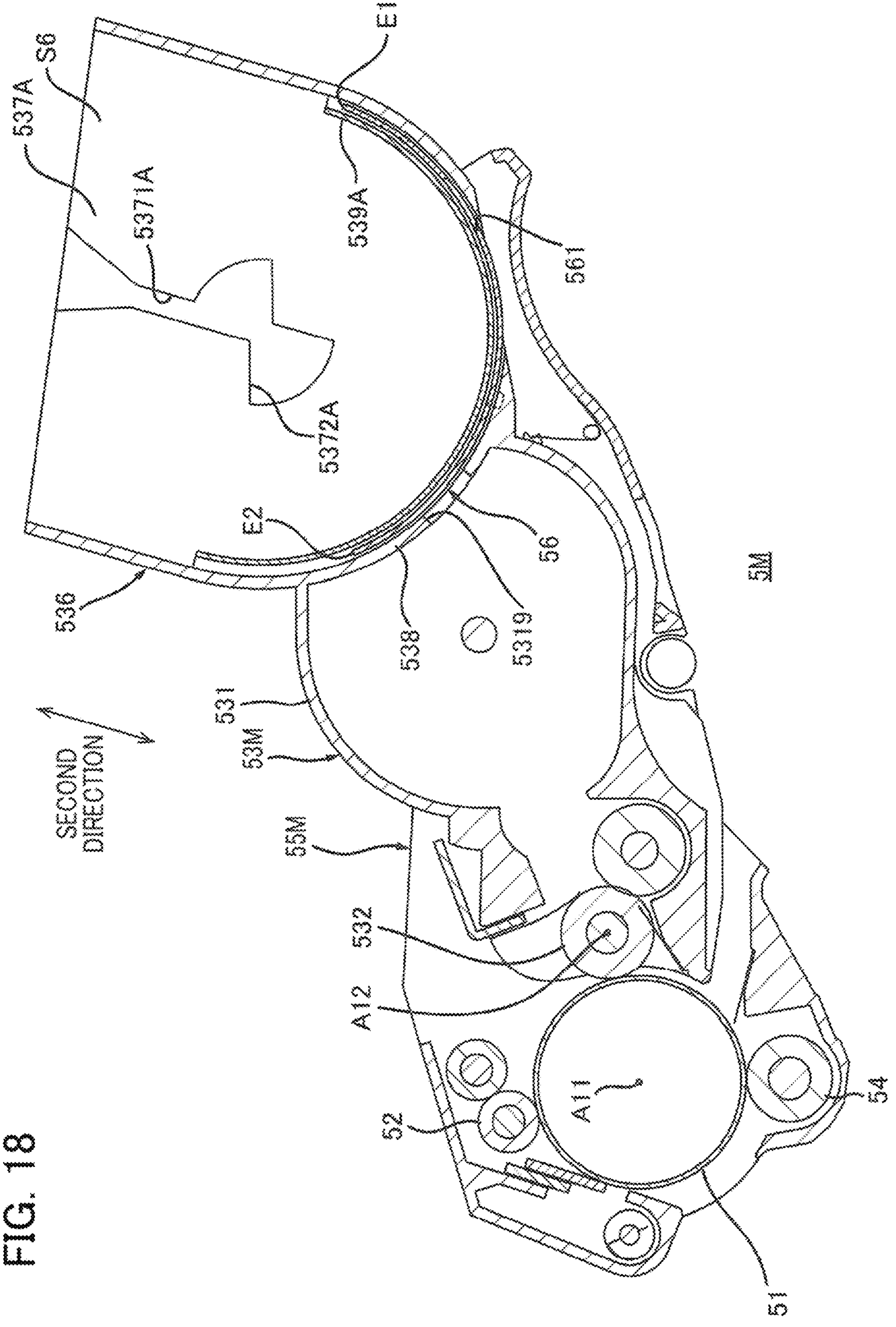
FIG. 18 is a cross-sectional view of the drum cartridge illustrated in FIG. 16 in a state where the developing shutter is at the closed position.

The guide portion 5371A is positioned at the inner surface S6 of the support side plate 537A. In the present modification, the guide portion 5371A is a groove. As illustrated in FIG. 18, the guide portion 5371A extends in the second direction.

The lock portion 5372A is positioned at one end portion of the guide portion 5371A in the second direction. In the present modification, the lock portion 5372A is a groove. The lock portion 5372A extends in a direction crossing the guide portion 5371A.

Figure 17:
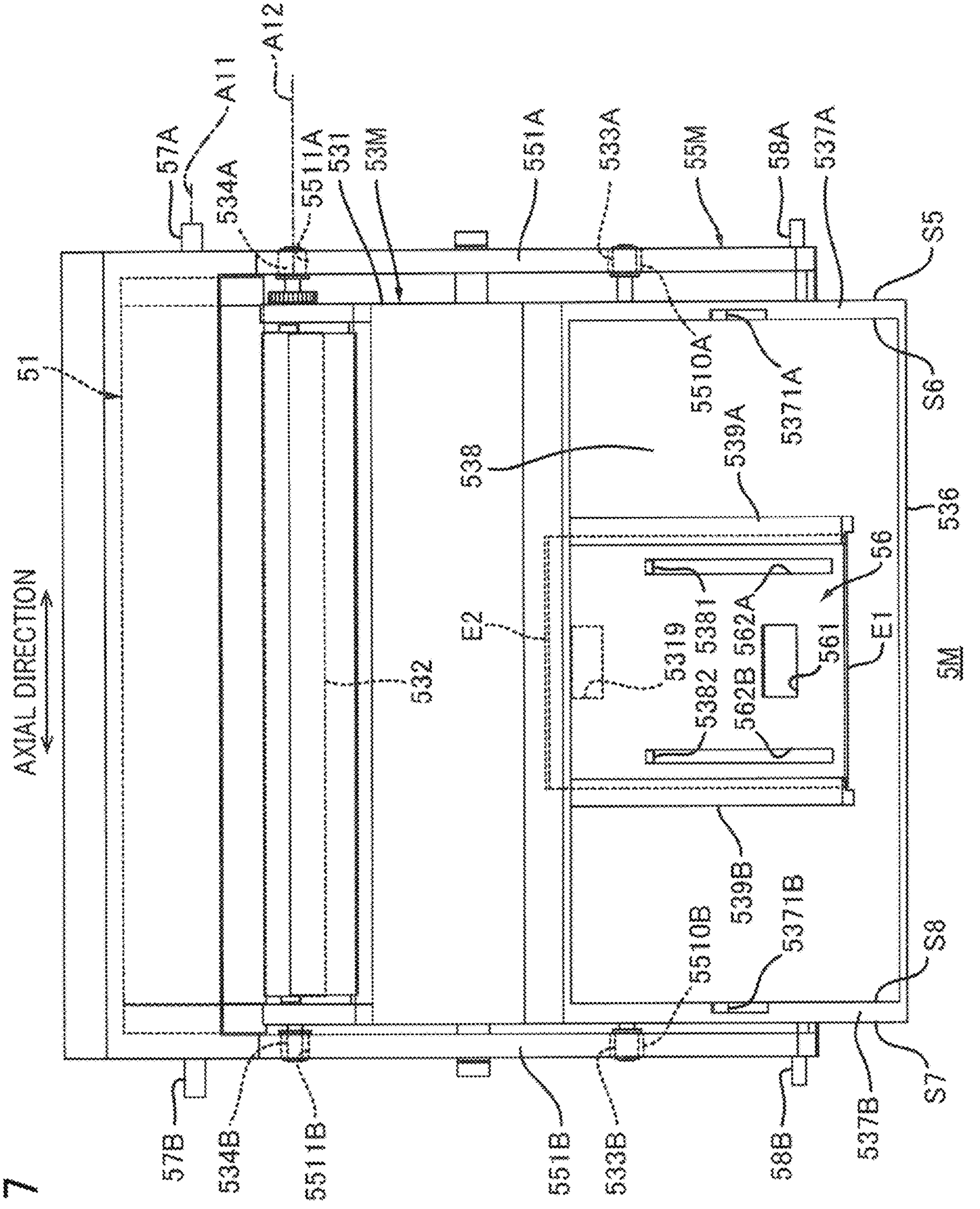
FIG. 17 is a plan view of the drum cartridge illustrated in FIG. 16.

As illustrated in FIG. 17, the support side plate 537B constitutes another end portion of the support portion 536 in the axial direction. The support side plate 537B is positioned apart from the support side plate 537A in the axial direction. The support side plate 537B extends in a direction crossing the axial direction. Preferably, the support side plate 537B extends in the direction orthogonal to the axial direction. The support side plate 537B has an outer surface S7 and an inner surface S8. As illustrated in FIG. 16, the support side plate 537B has a guide portion 5371B and a lock portion 5372B.

The guide portion 5371B is positioned at the inner surface S8 of the support side plate 537B. In the present modification, the guide portion 5371B is a groove. The guide portion 5371B extends in a direction coincident with an extending direction of the guide portion 5371A, i.e., in the second direction.

The lock portion 5372B is positioned at one end portion of the guide portion 5371B in the second direction. In the present modification, the lock portion 5372B is a groove. The lock portion 5372B extends in a direction coincident with an extending direction of the lock portion 5372A.

8.1.2 the Bottom Plate 538

The bottom plate 538 is positioned between the support side plate 537A and the support side plate 537B in the axial direction. The bottom plate 538 extends in the axial direction. The bottom plate 538 has one end in the axial direction that is connected to the support side plate 537A. The bottom plate 538 has another end in the axial direction that is connected to the support side plate 537B. In a state where the toner cartridge 6 is attached to the support portion 536, the bottom plate 538 extends along the peripheral surface S13 (FIG. 7) of the toner cartridge 6.

As illustrated in FIG. 17, the bottom plate 538 has an inlet opening 5319, a pair of recessed portions 5381 and 5382, and a pair of guide portions 539A and 539B.

The inlet opening 5319 is positioned at a center portion of the bottom plate 538 in the axial direction. The inlet opening 5319 is positioned between the recessed portion 5381 and the recessed portion 5382 in the axial direction. The inlet opening 5319 is positioned between the guide portions 539A and 539B in the axial direction. The inlet opening 5319 is positioned apart from the developing roller 532 in the direction connecting the drum axis A11 and the developing axis A12. The inlet opening 5319 is in communication with an internal space of the developing housing 531. The toner from the toner cartridge 6 is configured to pass through the inlet opening 5319.

The recessed portion 5381 is positioned between the inlet opening 5319 and the support side plate 537A in the axial direction. The recessed portion 5381 is positioned between the inlet opening 5319 and the guide portion 539A in the axial direction.

The recessed portion 5382 is positioned between the inlet opening 5319 and the support side plate 537B in the axial direction. The recessed portion 5382 is positioned opposite the recessed portion 5381 with respect to the inlet opening 5319 in the axial direction. The recessed portion 5382 is positioned between the inlet opening 5319 and the guide portion 539B in the axial direction.

As illustrated in FIG. 17, the guide portion 539A is configured to guide the one end portion of the developing shutter 56 in the axial direction. The guide portion 539A is positioned between the inlet opening 5319 and the support side plate 537A in the axial direction. The guide portion 539A is positioned between the recessed portion 5381 and the support side plate 537A in the axial direction. The guide portion 539A extends in the moving direction of the developing shutter 56.

The guide portion 539B is configured to guide the other end portion of the developing shutter 56 in the axial direction. The guide portion 539B is positioned between the inlet opening 5319 and the support side plate 537B in the axial direction. The guide portion 539B is positioned opposite the recessed portion 5381 with respect to the recessed portion 5382 in the axial direction. The guide portion 539B extends in a direction coincident with an extending direction of the guide portion 539A, i.e., the moving direction of the developing shutter 56.

8.2 Developing Shutter 56

Figure 19:
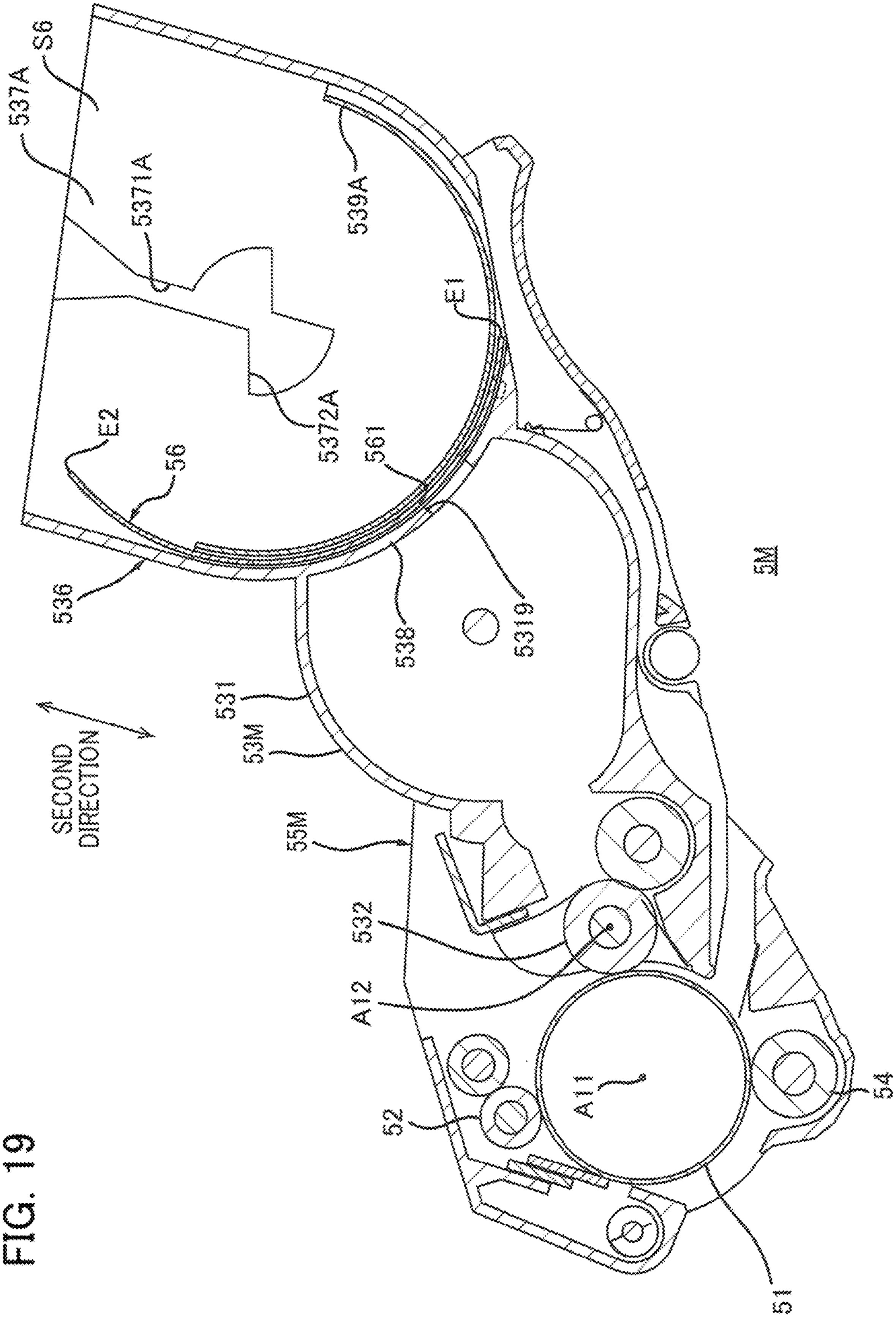
FIG. 19 is a cross-sectional view of the drum cartridge illustrated in FIG. 16 in a state where the developing shutter is at the open position.

As illustrated in FIGS. 18 and 19, the developing shutter 56 is configured to open and close the inlet opening 5319 of the bottom plate 538. Specifically, the developing shutter 56 is movable between a closed position (see FIG. 18) where the developing shutter 56 closes the inlet opening 5319 and an open position (see FIG. 19) where the developing shutter 56 opens the inlet opening 5319.

As illustrated in FIG. 18, in a state where the developing shutter 56 is at the closed position, the developing shutter opening 561 is positioned away from the inlet opening 5319. In the state where the developing shutter 56 is at the closed position, the developing shutter opening 561 does not communicate with the inlet opening 5319. Hence, the developing shutter 56 closes the inlet opening 5319.

As illustrated in FIG. 19, in a state where the developing shutter 56 is at the open position, the developing shutter opening 561 is in communication with the inlet opening 5319. Hence, the inlet opening 5319 is opened.

According to the configuration of the present modification, similar operations and technical advantages as the aforementioned embodiment can be attained.

[Remarks]

The image forming apparatus 1 is an example of an image forming apparatus of the disclosure. The housing 2 is an example of a housing. The opening 21 is an example of an opening of the housing. The first region 211 is an example of a first region of the opening of the housing. The second region 212 is an example of a second region of the opening of the housing. The first cover 3 is an example of a first cover. The second cover 9 is an example of a second cover. The drum cartridges 5, 5M are examples of a drum cartridge. The toner cartridge 6 is an example of a toner cartridge. The handle 66 is an example of a part of the toner cartridge, and an example of a handle. The end portion 661 is an example of an end portion of the handle. The protrusions 63A, 63B, 64A, 64B are another example of the part of the toner cartridge. The stoppers 24A, 24B are an example of a stopper of the housing. The guides 22A, 22B, 23A, 23B are examples of a guide of the housing. The protrusions 58A, 58B are examples of a protrusion of the drum cartridge. The drum frames 55, 55M are examples of a drum frame. The photosensitive drum 51 is an example of a photosensitive drum. The developing units 53, 53M are examples of a developing unit. The developing housing 531 is an example of a developing housing. The inlet openings 5311, 5319 are examples of an inlet opening of the developing housing. The developing roller 532 is an example of a developing roller. The developing shutter 56 is an example of a developing shutter. The toner casing 61 is an example of a toner casing. The discharge opening 610 is an example of a discharge opening of the toner casing. The toner shutter 65 is an example of the toner shutter.

What is claimed is:

1. An image forming apparatus comprising:
a housing having an opening;
a cover pivotable about a cover axis between a closed position closing the opening and an open position opening the opening;
a drum cartridge comprising a photosensitive drum; and
a toner cartridge configured to accommodate toner therein and detachably attachable relative to the drum cartridge, the toner cartridge comprising a handle pivotable about a handle axis between a first position and a second position in a state where the toner cartridge is attached to the drum cartridge, the toner cartridge being unable to be detached from the drum cartridge when the handle is at the first position and the toner cartridge being detachable from the drum cartridge when the handle is at the second position, the toner cartridge being attachable to and detachable from the drum cartridge that is attached to the housing through the opening in a state where the cover is at the open position and the handle is at the second position,
wherein, in a state where the toner cartridge is attached to the drum cartridge attached to the housing, the cover axis and the handle axis are parallel to each other, and
wherein the cover pivots from the closed position to the open position in a cover opening direction, and the handle pivots from the first position to the second position in a direction coincident with the cover opening direction.

2. The image forming apparatus according to claim 1,
wherein, in a state where the toner cartridge is attached to the drum cartridge and the handle is at the second position, the handle prevents the cover from being placed at the closed position.

3. The image forming apparatus according to claim 1,
wherein, in the state where the toner cartridge is attached to the drum cartridge attached to the housing, the handle does not protrude out from the opening when the handle is at the first position, but protrudes out from the opening when the handle is at the second position.

4. The image forming apparatus according to claim 3,
wherein the handle has an end portion, and
wherein the end portion of the handle protrudes out through a gap between an edge of the housing defining the opening and the cover when the handle is at the first position and the cover is at the closed position.

5. The image forming apparatus according to claim 4,
wherein the cover is configured to be pushed by the handle to move from the closed position to the open position in response to movement of the handle from the first position to the second position in a state where the handle is at the first position and the cover is at the closed position.

6. The image forming apparatus according to claim 1,
wherein the housing comprises a stopper configured to restrict the drum cartridge from moving while the handle moves from the first position to the second position in a state where the drum cartridge is attached to the housing.

7. The image forming apparatus according to claim 6,
wherein the stopper is a groove, and
wherein the drum cartridge has a protrusion, the protrusion being configured to be fitted with the groove in the state where the drum cartridge is attached to the housing.

8. The image forming apparatus according to claim 1,
wherein the drum cartridge comprises a developing unit movable relative to the photosensitive drum, the developing unit comprising:
a developing housing configured to accommodate the toner therein, the developing housing having an inlet opening through which the toner from the toner cartridge is configured to flow; and
a developing roller configured to supply the toner accommodated in the developing housing to the photosensitive drum.

9. The image forming apparatus according to claim 8,
wherein the drum cartridge further comprises a drum frame supporting the photosensitive drum, the toner cartridge being attachable to and detachable from the drum frame, and
wherein, in a state where the toner cartridge is attached to the drum frame, the toner cartridge does not move following movement of the developing unit.

10. The image forming apparatus according to claim 8,
wherein the toner cartridge is attachable to and detachable from the developing unit, the toner cartridge being movable in accordance with movement of the developing unit.

11. The image forming apparatus according to claim 8,
wherein the drum cartridge further comprises a developing shutter configured to open and close the inlet opening,
wherein the toner cartridge further comprises:
a toner casing configured to accommodate the toner therein, the toner casing having a discharge opening through which the toner is configured to be discharged; and
a toner shutter configured to open and close the discharge opening, and
wherein
in a state where the toner cartridge is attached to the drum cartridge and the handle is at the first position, the developing shutter opens the inlet opening and the toner shutter opens the discharge opening, and
in a state where the toner cartridge is attached to the drum cartridge and the handle is at the second position, the developing shutter closes the inlet opening and the toner shutter closes the discharge opening.

12. The image forming apparatus according to claim 1,
wherein the photosensitive drum is rotatable about a drum axis extending in an axial direction, the drum axis being parallel to both the cover axis and the handle axis in the state where the toner cartridge is attached to the drum cartridge attached to the housing.

13. The image forming apparatus according to claim 12, wherein the toner cartridge comprises a toner casing having a cylindrical shape extending in the axial direction, and wherein the handle is provided on a peripheral surface of the toner casing at a center portion thereof in the axial direction.

* * * * *